US011562345B2

(12) United States Patent
Wall et al.

(10) Patent No.: US 11,562,345 B2
(45) Date of Patent: Jan. 24, 2023

(54) EMV KERNEL FOR FASTER PROCESSING

(71) Applicant: Index Systems, Inc., San Francisco, CA (US)

(72) Inventors: Jonathan Wall, San Francisco, CA (US); Ross Favero, Berkeley, CA (US); Eric Nelson Glass, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 458 days.

(21) Appl. No.: 15/699,090

(22) Filed: Sep. 8, 2017

(65) Prior Publication Data

US 2018/0068303 A1    Mar. 8, 2018

Related U.S. Application Data

(60) Provisional application No. 62/385,165, filed on Sep. 8, 2016.

(51) Int. Cl.
    *G06Q 20/34*      (2012.01)
    *G06N 5/04*      (2006.01)
    *G07G 1/00*      (2006.01)
    *G06Q 20/36*      (2012.01)
    *G06Q 20/40*      (2012.01)
    *G06Q 30/02*      (2012.01)

(52) U.S. Cl.
CPC ........ *G06Q 20/341* (2013.01); *G06N 5/048* (2013.01); *G06Q 20/356* (2013.01); *G06Q 20/3563* (2013.01); *G06Q 20/3567* (2013.01); *G06Q 20/367* (2013.01); *G06Q 20/401* (2013.01); *G06Q 30/0201* (2013.01); *G07G 1/0009* (2013.01); *G06Q 2220/00* (2013.01)

(58) Field of Classification Search
None
See application file for complete search history.

(56) References Cited

U.S. PATENT DOCUMENTS

| | | |
|---|---|---|
| 5,396,558 A * | 3/1995 | Ishiguro ............... G06Q 20/401 380/30 |
| 5,649,118 A | 7/1997 | Carlisle et al. |
| 6,993,503 B1 | 1/2006 | Heissenbuttel et al. |
| 2002/0111919 A1 | 8/2002 | Weller et al. |
| 2005/0159974 A1 | 7/2005 | Moss et al. |
| (Continued) | | |

OTHER PUBLICATIONS

Search Report and Written Opinion dated Nov. 29, 2017 which issued in the International Patent Application No. PCT/US17/50633.

(Continued)

*Primary Examiner* — Steven S Kim
*Assistant Examiner* — Jason B Fenstermacher
(74) *Attorney, Agent, or Firm* — Womble Bond Dickinson (US) LLP

(57) ABSTRACT

Methods of performing transactions with a payment card comprising an integrated circuit are disclosed comprising interacting with an integrated circuit on a received payment card and inferring an application corresponding to a card brand and card type of the payment card, or retrieving a map of the integrated circuit to read records on the integrated circuit based on the map, are disclosed. Corresponding devices, such as PIN pads, and computer products are also disclosed.

20 Claims, 15 Drawing Sheets

(56) References Cited

U.S. PATENT DOCUMENTS

| | | | |
|---|---|---|---|
| 2005/0188360 A1* | 8/2005 | de Jong | G07F 7/1008 |
| | | | 717/136 |
| 2005/0222958 A1 | 10/2005 | Hasegawa et al. | |
| 2006/0049255 A1 | 3/2006 | Von Mueller et al. | |
| 2008/0091944 A1 | 4/2008 | Von Mueller et al. | |
| 2008/0165006 A1 | 7/2008 | Phillips | |
| 2009/0006262 A1 | 1/2009 | Brown et al. | |
| 2010/0051685 A1* | 3/2010 | Royyuru | G06Q 20/34 |
| | | | 235/379 |
| 2011/0264499 A1 | 10/2011 | Abendroth et al. | |
| 2012/0011070 A1 | 1/2012 | Ward et al. | |
| 2013/0304642 A1 | 11/2013 | Campos | |
| 2014/0156535 A1 | 6/2014 | Jabbour et al. | |
| 2015/0073926 A1* | 3/2015 | Royyuru | G06Q 20/34 |
| | | | 705/17 |
| 2015/0154634 A1 | 6/2015 | Chiu et al. | |
| 2015/0186864 A1* | 7/2015 | Jones | G06Q 20/3278 |
| | | | 705/39 |
| 2017/0186007 A1 | 6/2017 | Lam | |
| 2017/0278085 A1* | 9/2017 | Anderson | G06Q 20/405 |
| 2018/0357634 A1* | 12/2018 | Shin | G06Q 20/36 |

OTHER PUBLICATIONS

Fabian Meier, "Whitepaper ax eft Kernel EMV Level 2 Kernel—a Software Module for EFTPOS Terminals", Abrantix AG, 2009, Mar. 20, 2009, Version v1.0.

Canadian Office Action for Application No. 3035666 dated Apr. 28, 2020, 4 pages.

Extended European Search Report for Application No. 17849587.5 dated Feb. 25, 2020, 7 pages.

Australian Office Action and Search Report on the Patentability of Application No. 2020257022 dated Oct. 13, 2021, 6 pages.

EMV; Integrated Circuit Card—Specifications for Payment Systems; Book 1; Application Independent ICC to Terminal Interface Requirements; Version 4.3; Nov. 201, 189 pages.

Mastercard, "Secure Payment Technologies Demystified", Sep. 2015 (Year: 2015), 5 pages.

* cited by examiner

EMV KERNEL FOR FASTER PROCESSING

RELATED APPLICATION

The present application claims the benefit of U.S. Provisional Patent Application No. 62/385,165, which was filed on Sep. 8, 2016, is assigned to the assignee of the present invention, and is incorporated by reference herein.

FIELD OF THE INVENTION

Electronic processing of smart payment cards in commercial transactions, and, in particular, electronic processing of payments via smart payment cards through, in part, reduced card interaction times to reduce payment card processing times.

BACKGROUND OF THE INVENTION

A. Card Processing

FIG. 1 is a schematic representation of a card processing environment 100 to process card transactions, as is known in the art. A card can be a credit card, debit card, or gift card, for example. In this example the card is an EMV credit, debit, or gift card. EMV is a technical standard for smart payment cards, which include an integrated circuit or chip embedded into the card. The standard also applies to payment terminals and automated teller machines that can accept such smart payment cards. EMV stands for Europay, MasterCard, and Visa, who created the standard. Smart payment cards are referred to as "EMV cards," "chip cards," or integrated circuit ("IC") cards or ICCs, for example.

The card processing environment 100 includes a merchant or store of a merchant 102, which includes a point of sale ("POS") terminal and a PIN pad terminal 106. Card and transaction data collected by the PIN pad 106 are sent to a payment gateway 108, such as Index Systems, Inc., San Francisco, Calif., for example, via a network 110, such as the internet. The payment gateway 108 can provide analytic information to the merchant 102 and other parties in FIG. 1, for example, and routes the data to an appropriate one of a plurality of payment processors 112 (only one of which is shown in FIG. 1), also via the network 110. The PIN pad 106 may instead route the card and transaction data directly to the appropriate payment processor 112 via the network 110. The payment processor 112 routes the data to a card brand 114 of the card, such as Visa or MasterCard, for example, for verification of the card number and expiration date and other operations known in the art. The single card brand 114 shown in FIG. 1 represents the multiple card brands that could be a part of the environment 100.

If the card data is verified, the card and transaction data are routed by the card brand 114 to the issuing bank 116 that issued the credit card to check credit limits and perform other operations known in the art. If the issuing bank 116 approves the transaction, then it sends an authorization or approval message back along the chain, to the card brand 114, payment processor 112, gateway 108, and ultimately to the PIN pad 106, via the network 110 in each step. The PIN pad 106 then accepts the payment via the card. If the card brand 114 or the issuing bank 116 does not verify the card data or authorize the transaction, respectively, a denial message is returned along the same chain to the payment processor 112, via the network 110, to the PIN pad 106. The PIN pad 106 will not then accept the card payment, and alternative form of payment may be requested. As with the card brand 114, the one issuing bank 116 shown in FIG. 1 represents the multiple issuing banks that could be part of the environment 100.

The push to deploy EMV in the US has presented implementation challenges and has degraded user experience. A traditional EMV transaction requires that the card including the EMV chip ("EMV card") be inserted into a reader for payment when a transaction is complete and the final total is known. The EMV card must remain inserted in the reader for the full duration of the authentication call to the card brand and issuing bank, which may take more than 10 seconds. This slow and cumbersome experience has frustrated both consumers and retailers and resulted in longer lines, confused cashiers and frequently orphaned cards as consumers forget to remove their cards from the EMV reader.

To alleviate the degraded user experience in EMV transactions, Visa and MasterCard ("MC") both introduced amendments to the EMV specification in early 2016 that enable the card to be inserted at any time during the transaction and allow the user to remove the card without waiting for the transaction total and subsequent authorization. While this alternative is faster than a traditional EMV transaction and provides an improved user experience, it comes at the cost of degraded card capabilities as the card can no longer be "remotely updated" by the issuing bank 116 as part of the transaction.

B. Anatomy of an EMV Transaction

FIG. 2 is a block diagram of a typical EMV transaction process 200, as is known in the art. The EMV transaction process is implemented on a PIN pad 106 or other such payment terminal. The software controlling the processor of the PIN pad 106 during EMV transaction processing is referred to as an EMV Kernel. The EMV kernel may be provided with the PIN pad 106 from the PIN pad provider, such as Verifone or Ingenico, for example.

1. Media Select

The terminal applies power and a clock signal to the integrated circuit of the card, and negotiations take place between the ICC and terminal to agree on a protocol and data rate speeds to communicate, in the media select step 205. The clock signal starts a synchronization with the integrated circuits.

2. Directory Services

The terminal 106 builds a list of candidate applications supported by the integrated circuit, in a directory services step 210. The list is built on the terminal 106 using the payment system environment ("PSE") or by individually querying the integrated circuit on the card for the presence of each application supported by the terminal. Individual querying of the integrated circuit takes a significant amount of time.

3. Application Selection

The application to be used in processing the transaction is selected via the terminal 106, in an Application Selection step 215. This can be done manually by the cardholder via a display screen of the terminal 106 or automatically by the terminal. The application to be used may be dependent on the card type (credit, debit, gift, for example), card brand (Visa, MC, American Express, Discover, etc.), and issuing bank (Chase, Citibank, Wells Fargo, Schwab, etc.), for example.

The application may be automatically selected by the terminal 106 by reading every application file for each card that can be processed by the terminal 106 and the querying the integrated circuit individually by an identifier of each application file. The application that is confirmed by the integrated circuit is used by the terminal 106 in subsequent steps in the EMV process. This is because, as currently configured, the integrated circuit on the card cannot directly inform the PIN pad that a particular application should be used.

4. Read Card Options

The terminal reads all of the records stored on the integrated circuit that may be relevant to the transaction, in a Read Card Options step 220. Records include supported EMV features and card account number and personalization information, for example.

5. Offline Data Authentication

The terminal 106 uses a static data authentication ("SDA"), dynamic data authentication ("DDA"), or combined data authentication ("CDA") process to verify the legitimacy of the ICC offline, in an Offline Data Authentication step ("ODA") 225. Using SDA, the terminal 106 verifies the validity of the static data contained on the integrated circuit. Using DDA/CDA, the terminal 106 confirms the validity of dynamic data sent to the integrated circuit in order to prevent counterfeiting of any card.

6. Processing Restrictions

The terminal 106 compares application versions, expiration dates, and other parameters of the card to ensure the transaction can continue, in a processing restrictions step 230.

7. Cardholder Verification

The terminal 106 and integrated circuit agree on a method of validating the cardholder and perform validation, in a Cardholder Verification step 235. Available cardholder verification methods ("CVMs") include entering a PIN number (online, offline plaintext, offline enciphered), Signature verification, and None (no verification if not required by a respective integrated circuit and merchant requirements).

8. Terminal Risk Management/Action Analysis

The terminal 106 performs velocity checking/floor limits to determine the transaction result (offline approved, offline declined, transaction must go online), in a terminal risk management/action analysis step 240.

9. Card Action Analysis (GEN1 AC)

In the Card Action Analysis step 245, the terminal 106 sends the integrated circuit a set of dynamic (transaction related) and static (card related) Data Objects with a GEN1 AC command. In response to the command, the integrated circuit generates a unique Authorization Cryptogram and the returns the Authorization Cryptogram to the terminal 106.

10. Online Processing

An authorization request is sent to the payment gateway 108/issuing bank 116 including the Authorization Cryptogram, by the terminal 106, via the network 110, in an Online Processing step 250.

11. Card Action Analysis (GEN2 AC)

The response of the issuing bank 116, along with any additional scripts, are sent to the integrated circuit, via the network 110, in a Card Action Analysis step 255. The integrated circuit may then be required to update its internal state by running any issuer scripts sent by the issuing bank 116, such as a change to the cardholder PIN or resetting an invalid pin counter, for example. The issuing bank 116 may also send a script, such as a script to update the local credit limit of the card on the integrated circuit, for example.

C. The FastEMV/QuickChip Transaction

For the purposes of this document, the term "FastEMV" is used as a consolidated term for the various branded EMV amendments, such as Quick Chip from Visa and M/Chip Fast from MasterCard, that increase the processing speed of EMV transactions.

In order to expedite the time the IC is required to be kept in a PIN pad, the FastEMV flow has two primary differences from the typical EMV transaction of FIG. 2:

1. The terminal 106 uses a random transaction amount to issue to the card during the Card Action Analysis (GEN1 AC) step 245, prior to the transaction being totaled. This means that at any point in the transaction, before the final amount is known, the terminal 106 can instruct the integrated circuit to generate the Application Cryptogram for online processing. The amount at this step is only used for encryption purposes and has no bearing on the amount charged.

2. Once the terminal 106 has obtained the Application Cryptogram from the integrated circuit, the terminal 106 indicates to the card during the GEN2AC step 255 that the transaction has been deferred for authorization. This tells the integrated circuit that the issuer is offline (despite that not being the case in reality) and the authorization is deferred, allowing the terminal 106 and integrated circuit interaction to terminate gracefully. This early termination of the GEN2AC step 255 results in no communication between the issuing bank 116 and the integrated circuit.

SUMMARY OF THE INVENTION

The FastEMV specification, despite improvements to the length of the traditional EMV flow, still takes too long for consumers. In addition, to allow for the removal of card at any point, the FastEMV flow is unable to facilitate the issuing of scripts to integrated circuits that are in the reader. This is particularly troublesome in international markets, where the PIN form of customer verification, which relies on script processing for updating/resetting pin counters, is ubiquitous. Furthermore, in the FastEMV paradigm, the integrated circuit is not updated with transaction "counters" which are used to provide a decoupled communication between the card and the issuer without relying on the issuer to validate the card status.

Embodiments of the invention enable faster, more secure processing of EMV transactions, compared to typical EMV processing and also to the FastEMV processing, as well as allowing failover to portions of the traditional EMV process as needed. As a result, in accordance with embodiments of the invention, the EMV Vector Kernel can adapt to different environments, processing requirements, geographic locations, etc. In addition to improving processing performance speed, embodiments of the invention look to optimize and provide an online EMV script process capability that cannot be provided with the existing Fast EMV process In accordance with an embodiment of the invention, a method of performing a transaction with a payment card comprising an integrated circuit is disclosed comprising interacting with an integrated circuit on a received payment card, inferring an application corresponding to a card brand and card type of the payment card; and sending a first message containing an identifier of the inferred application to the integrated circuit. The method further comprises receiving a second message from the integrated circuit, the second message being a confirm message confirming the inferred application, or a reject message rejecting the inferred application; and if the message is a confirm message, completing the transaction using the inferred application. Corresponding device and computer product embodiments are also disclosed.

In accordance with another embodiment of the invention, a method of performing a transaction with a payment card comprising an integrated circuit comprises interacting with an integrated circuit on a received the payment card; determining a combination of a card brand and/or a card issuer of the payment card; retrieving a map of the integrated circuit based, at least in part, on the card brand and/or card issuer; identifying one or more locations of records on the integrated circuit containing the card number and/or card information on the integrated circuit, based on the map; and reading the one or more identified locations to acquire the card number and/or card information. The method further comprises using the read card number and/or card information to complete processing of the transaction. Corresponding device and computer product embodiments are also disclosed

DESCRIPTION OF THE EMBODIMENTS

Figure 1:
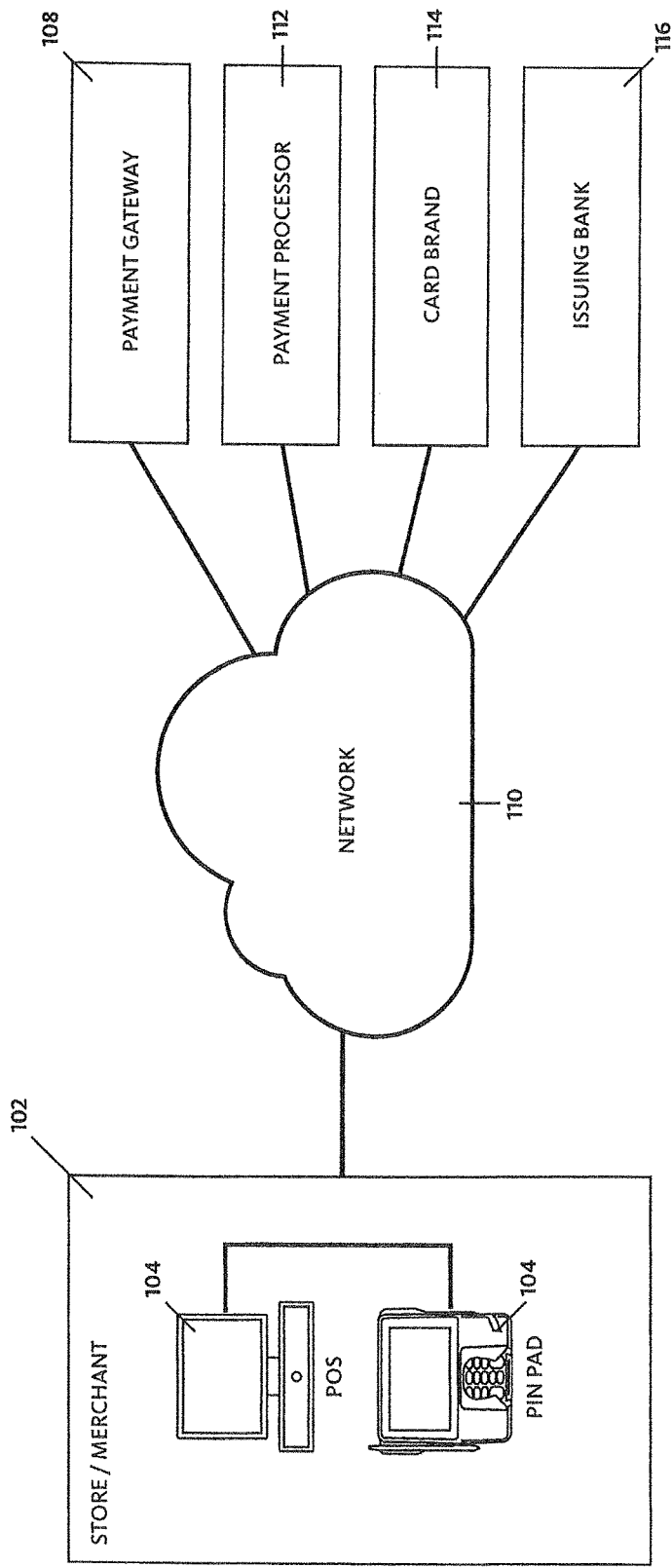
FIG. 1 is a schematic representation of a card processing environment in which embodiments of the invention may be implemented.
Figure 3:
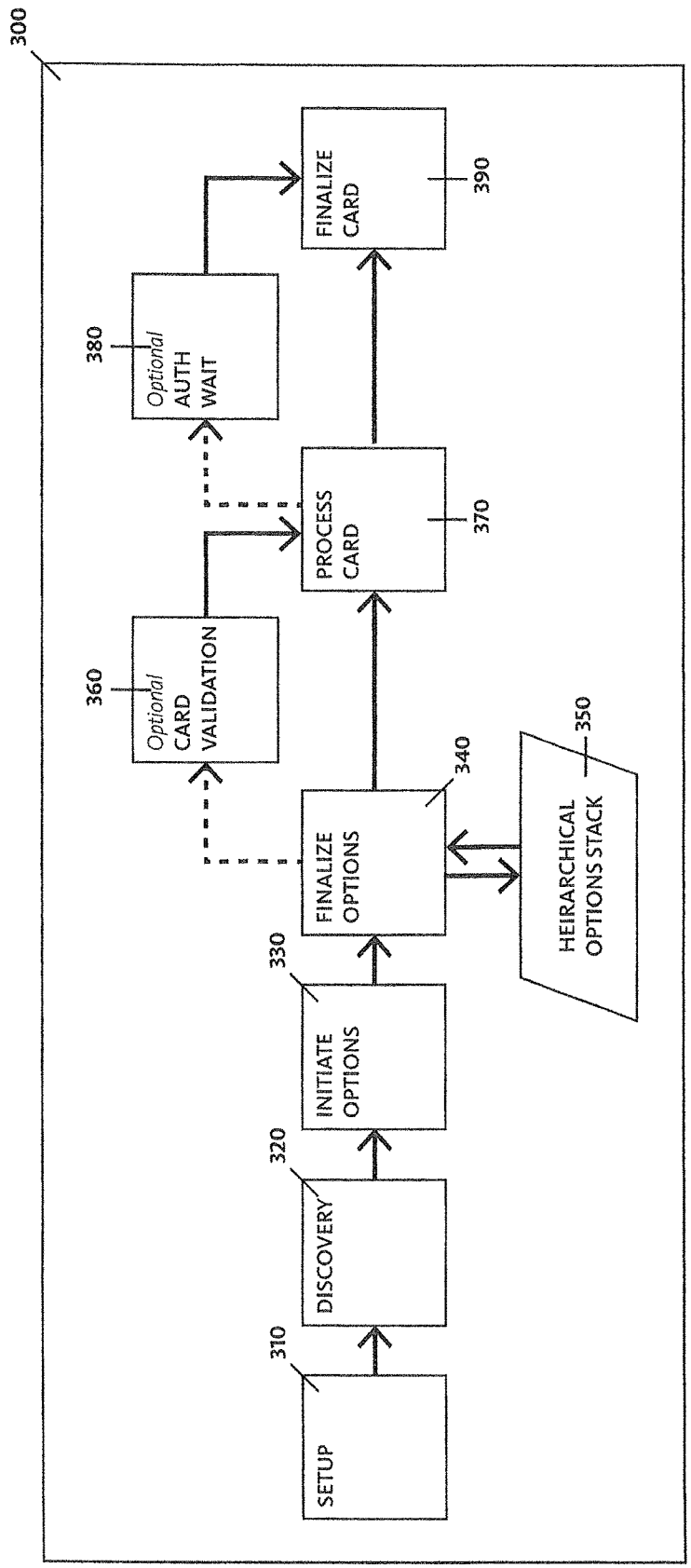
FIG. 3 is a block of an example of a process implemented by the processing device of the PIN pad, under the control of an EMV Vector Kernel software, in accordance with an embodiment of the invention.

FIG. 3 is a block diagram of an example of a process 300 in accordance with an embodiment of the invention which is implemented by a processing device of the terminal or PIN pad 400. The process 300 is also referred to herein as a managed EMV Vector Kernel 300, which is implemented by a processor under the control of EMV Vector Kernel software. In this example, the process of FIG. 3 and the PIN pad 400 operate in the environment of FIG. 1. The EMV Vector 300 implements a pipeline of a plurality of software modules 310-390, each of which performs a phase of the EMV transaction. As the transaction progresses, transaction data and options are passed from a current active module to the next module in the pipeline. Some modules are optional and can be bypassed depending on actions/determinations made in prior modules and the state of the transaction, such as card type and, card validation, for example, as discussed further below. The transaction flow, from module to module, is referred to herein as the Vector. Certain modules use automators, which are software subroutines that perform certain of the functional task(s) required by the module. Certain modules decrease the number of reads of the integrated circuit on the payment card that are required to continue processing. It has been found that each read may take about 120 milliseconds, for example. It is not necessary for all modules to be implemented to achieve some improvements in processing speed, in accordance with embodiments of the invention. The EMV Vector Kernel software 300 in accordance with embodiments of the invention may be readily updated and adapted to different environments.

In some modules, choosing an optimal automator in a particular situation during the processing of a respective card is based on transaction options passed through the pipeline, from module to module, along with the card and transaction data. Certain transaction options may be constructed by resolving a Hierarchical Option Stack 350 for each card passing through the pipeline, as discussed below. The Hierarchical Option Stack or "Stack" 350 allows configuration values to be encoded at the card brand, issuer, merchant, card level, and other parties to the transaction. The Stack 350 is discussed further below.

Figure 4:
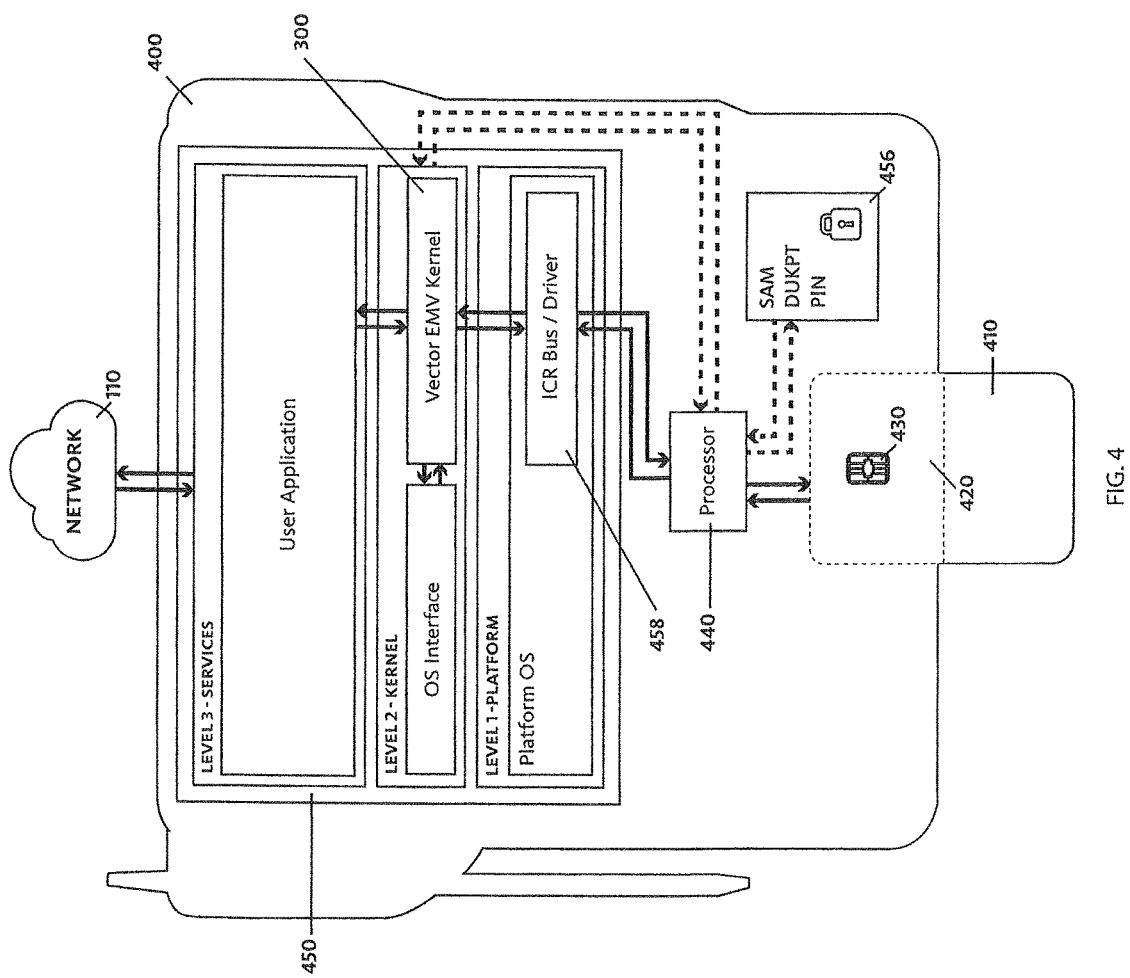
FIG. 4 is a schematic representation of a terminal or PIN pad, in accordance with an embodiment of the invention.

FIG. 4 is a schematic diagram of the functional components of a terminal or PIN pad 400 that incorporates the EMV Vector Kernel software 300, in accordance with an embodiment of the invention. An EMV payment card 410 is shown inserted into a reader 420 of the PIN pad 400. The payment card 410 comprises an integrated circuit ("IC") 430. Other components of the PIN pad 400 include a processor 440, such as a microprocessor, and storage 450. The storage 450, which is a non-transitory computer-readable medium, stores software for controlling the operation of the PIN pad 400, including the EMV Vector Kernel software 300. Three levels of the storage 450 are indicated in FIG. 4, Level 1—Platform, Level 2—Kernel, and Level 3—Services. Level 1—Platform stores the operating system of the platform. Level 2—Kernel stores an OS interface 454 and the Vector EMV Kernel 300. Level 3—services stores use applications related to services provided by the PIN pad 400, as is known in the art. A Secure Module ("SAM") 456 performs secure cryptographic operations, such as encryption of a debit PIN using a 3DES DUKPT key, for example. An ICR Bus/Driver 458 enables communication between the processor 440 and the EMV Vector Kernel software 300, and the processor 440 and the Level 3 applications. Volatile memory, such as RAM (not shown) may also be provided.

The PIN pad 400 typically also includes a swipe reader (not shown) to read data from a magnetic strip on a non-EMV card and to read data from an EMV card if the integrated circuit malfunctions. The PIN pad terminals 130 may be a Verifone MX915 or Verifone MX925, available from Verifone Holdings, Inc., San Jose Calif., or an Ingenico iSC250 or Ingenico iSC480, available from Ingenico Solutions, Rowlands Castle, England, for example.

Setup Module

Figure 5:
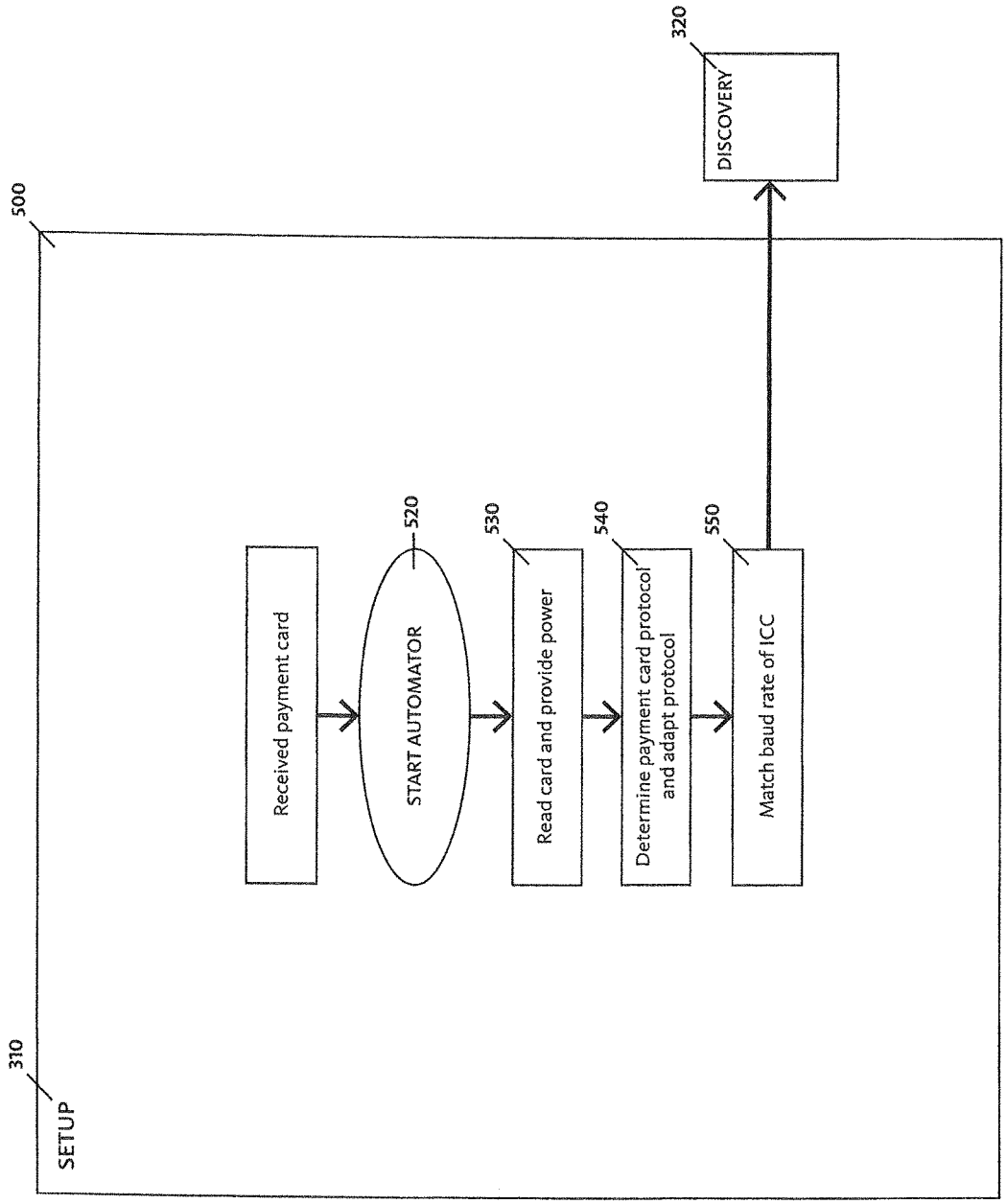
FIG. 5 is a more detailed block diagram of an example of a Setup module in the process of FIG. 3, in accordance with an embodiment of the invention.

FIG. 5 is a flowchart 500 of an example of the operation of the Setup Module 310 of the operation of EMV Vector Kernel 300, in accordance with an embodiment of the invention. A payment card 410 received in Step 510. Receipt of an EMV payment card 410 causes activation of a Setup Automator 510, in Step 520. The Setup Automator 520 operates in a similar manner to the Media Select step of FIG. 2. The Setup Automator 520 reads the IC 430 on the inserted payment card 410 and provides voltage to the IC, in Step 530. The protocol used by the IC 430 is also determined by the PIN pad 400, which adopts that protocol for the remainder of the process, in Step 540. Handshaking is performed between the PIN pad and the IC to configure an optimal baud rate (data/clock speed at which the ICC can received and send data speeds), in Step 550, in a manner known in the art.

After Setup 550, control of the process 300 is passed to the Discovery Module 320, in Step 560 as indicated in FIG. 5 and in FIG. 3.

Discovery Module

Figure 6:
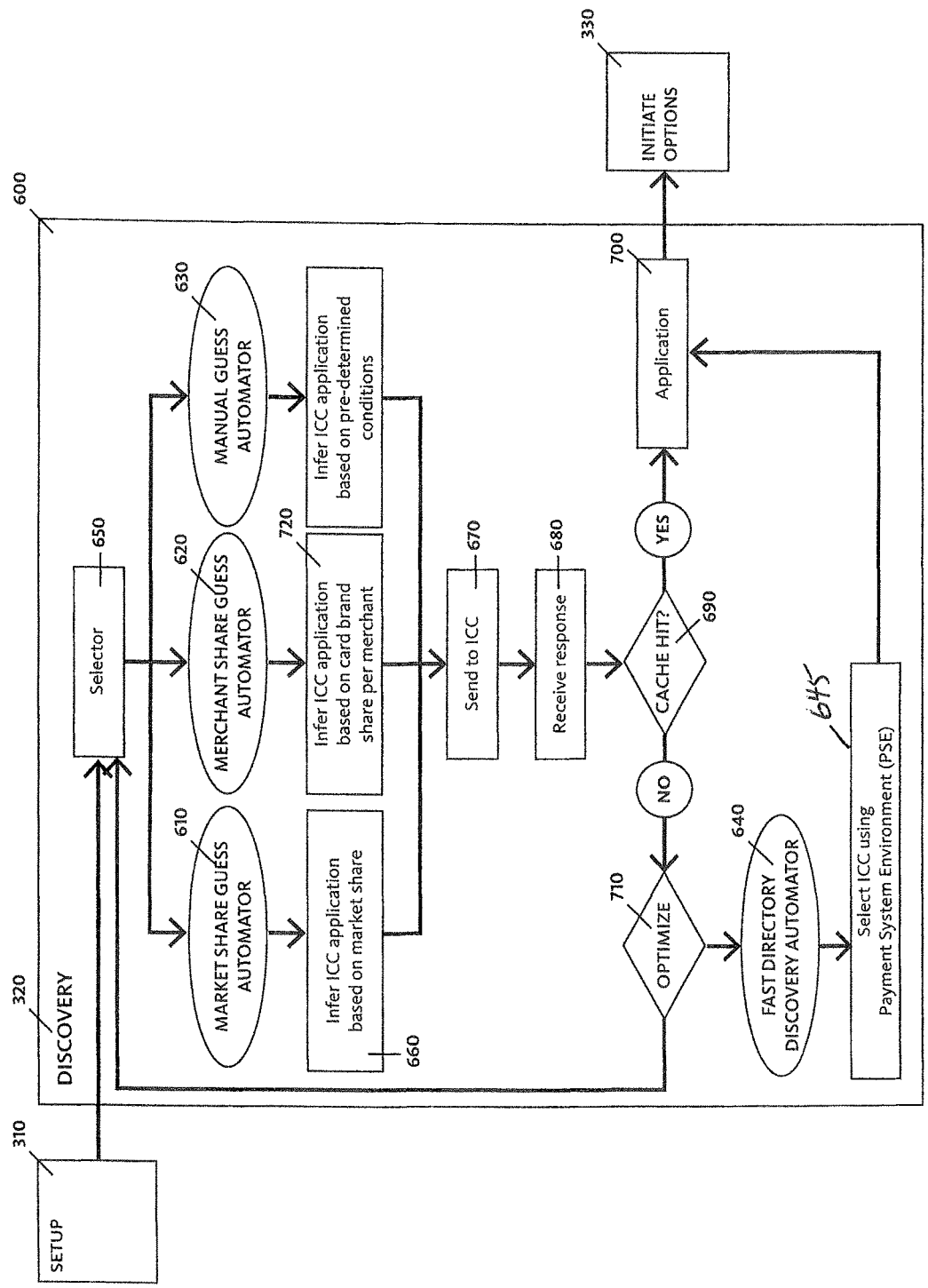
FIG. 6 is a more detailed block diagram of an example of the Discovery Module of FIG. 3, in accordance with an embodiment of the invention.

FIG. 6 is a flowchart 600 of an example of the operation of the Discovery Module 320 of FIG. 3. The functionality of the Discovery module 320 is related to, and is an improvement upon, the Directory Services and Application Select steps in the prior art process of FIG. 2. As discussed above, in the Directory Services and Application Select steps in the prior art, the application(s) is selected using the Payment System Environment (PSE) by querying the IC 430 for application identifiers that correspond to the card brand and card type of the payment card 410. The retrieved application identifiers are compared to each of the card brand/card type applications stored on the PIN pad 400 that correspond to the combinations of card brands and card types that can be processed by the PIN pad 400. This is because as currently configured, the IC on the payment card 410 cannot directly inform the PIN pad 400 of its card brand/case type and the particular application that should be used.

To potentially decrease the number of reads of the IC 430 and thereby decrease processing time, a guess or inference of the probable card brand (Visa, MasterCard, Discover, etc.), and the card type (credit, debit, EBT, etc.) of the payment card 400 is made by the Discovery Module 320, to identify an applicable application(s). If the inference is correct, processing proceeds with the application corresponding to the inferred card brand/type. Processing time may thereby be significantly reduced as compared to the Directory Services and Applications Select steps of FIG. 2, because unnecessary reads are reduced or eliminated.

The Discovery Automators in this example comprise a Total Market Share Guess Automator 610, a Merchant Share Guess Automator 620, a Manual Guess Automator 630 (also referred to herein as "Guess Automators 610, 620, 630"), and a Fast Directory Discovery Automator 640, for example, as shown in FIG. 6. An inference of the card brand/type of the card being processed is made by a selected one of the Guess Automators 610, 620, 630 and sent to the IC 430, which confirms or rejects the guess. If one or more inferences are incorrect, then the Fast Directory Automator 640 is implemented. The output of the Discovery module 320 is one or more application identifiers corresponding to the card brand and card type of the payment card 410, allowing the next module, which in this example is the Initiate Options Module 340, to continue to process the transaction.

Total Market Share Guess Automator

The Total Market Share Guess Automator 610 uses an application selection method to infer the IC application to be used based on the market share for the combination of the card brand and card type for the payment card being analyzed. For example, the card being analyzed may be a Visa credit card, which can require a different application than a Visa or MasterCard debit card, for example. In this Automator, the card being processed is assumed to be the card brand/type combination that has the highest market share. The market share can be provided by the gateway 108 based on all of the prior card transactions processed by the gateway within a time period, and/or publicly available information, for example. The total market share may be based only on EMV transactions in a time period or all card transactions in the time period, for example. The total market share may be further based on the geographic location of the merchant or store. For example, the market share may represent a worldwide market share; a market share in a specific country, such as the US; or a market share in a specific state, county, or town where the merchant or store is located, for example. A table or listing of market shares for different card brand/card type combinations may be defined in the software defining the EMV Vector Kernel 300, which is stored in the storage 450 of the PIN pad 400, and periodically updated, as needed.

Merchant Share Guess Automator

The Merchant Share Guess Automator 620 infers the IC application based on the card brand and type with the highest market share with the respective merchant or merchant store. In other words, the card being processed is assumed to be the most commonly used payment card or EMV payment card at the respective merchant or store, in a configurable time period. The market share may be based on the EMV card transactions processed by the gateway for a respective merchant, publicly available information, and/or information provided by the merchant or store, for example.

The Manual Guess Automator

The Manual Guess Automator 630 uses an application selection method to infer the IC application based on predetermined conditions. These conditions may be based on special relationships with card brands or unique merchant requirements. For example, a merchant 102 may only MasterCard credit cards of the major US credit card brands. Therefore, in PIN pads at such a merchant 102, the Manual Guess Automator 630 infers that the card brand and card type is MasterCard credit card.

As above, an application Cache Hit or correct inference of application by any of these automators can yield over 2× speed increases over common application selection mechanisms. An application Cache Miss results in a fallback to the Fast Directory Discovery Automator 640.

In this example, if predetermined conditions are known to exist, the processor 440 of the PIN pad 400 is programmed by the EMV Vector Kernel 300 to pass control directly to the Manual Guess Automator 630. This is a default if such predetermined conditions are known. The EMV Vector Kernel may also be remotely configured by the payment gateway 108, for example, to use the Manual Guess Automator 630, through an update provided by the payment gateway 108, for example.

In one example, even if the only Manual Guess Automator 630 is used, the software defining the EMV Vector Kernel process would still include the Market Share Automator 610 and the Merchant Share Automator 620, to enable use of a single software package for all PIN pads 400 and to accommodate changes in relationships over time (i.e., if a merchant 102 that had only accepted on card brand and card type, decides to accept all card brands and card types). Alternatively, when it is known that only the Manual Market Guess Automator 630 is needed, such as for current PIN pads 400 in Costco, for example, the EMV Vector software package 300 may only include the Manual Guess Automator 630.

Fast Directory Discovery Automator

In one example, the Fast Directory Discovery Automator 640 uses the prior art Payment System Environment ("PSE") method of selecting an IC application to reveal IC supported applications, as discussed above. This is the same method discussed above in the prior art process of FIG. 2.

In accordance with this embodiment invention, the comparison of the application identifiers retrieved from IC 430 stops and the PSE operation is exited when a matching application for each retrieved application identifier is found on the PIN pad 400. This increases processing speeds by not continuing to compare retrieved application identifiers to those on the PIN pad 400, when matching identifiers are found.

The Fast Directory Discovery module can also be configured to infer a predetermined order of card brands and/or types, such as to check Visa credit, Visa debit, MC credit, MC debit, and AMEX credit, AMEX debit in that order, for example. Other orders may be used.

An example of a method of operating the Discovery module is shown in FIG. 6. After control of the process is passed from the Setup Module 310 to the Discovery Module 320 in Step 560 of FIG. 5, one of the Guess Automators 610, 620, 630 is selected to make a first inference, in Step 650 of FIG. 6. The processor 440 may be programmed by the EMV Kernel Vector software 300 on the PIN pad 400 to direct control to a particular one of the Guess Automators 610, 620, 630 based on which Automator has the most current information, for example. This determination may be made by the processor 440 based on the date of most recent update to the respective Guess Automators 610, 620, 630, or by the party providing or managing the EMV Vector Kernel 300, such as the gateway 108 or the PIN pad provider, for example. Updates to a respective PIN pad 410 may also include an instruction to use a particular Automator, such as the Manual Guess Automator 630, if a relationship has been established between the merchant and a particular card brand.

The processor 440 of the PIN pad 400, the gateway 108, and/or a PIN pad provider may also monitor successful inferences by each Guess Automator 610, 620, 630 and determine which Guess Automator to use based on the relative success of the past inferences by each Automator. Artificial intelligence, such as machine learning, for example, may be used by the PIN pad 400, gateway 108, and/or PIN pad provider to learn whether a particular Automator, or a particular card brand/card type, is more likely to be used in general, or on a particular day (weekday vs. weekend, for example), or time of day, for example.

The Discovery Module 320 may also be configured to establish a selection order. In this example, when there is no known relationship between the merchant and a card brand/type, the Total Market Share Automator 610 is selected first. In this example, the Total Market Guess Automator 610 is selected in Step 650 to make the first inference based on the card brand/card type having the highest market share, and generates a first inference message in Step 660. The message is sent by the processor 440 of the PIN pad 400 to the IC 430 of the payment card 410, in Step 670. When the IC 430 receives the inference message, the IC checks the applications stored on the IC corresponding to the card brand/card type on the IC, and returns a "confirm inference" or other such message, if there is a match. If the inferred application is not correct, the IC returns a "reject inference" message. The response is received by the PIN pad 400 in Step 680, and evaluated in Step 690. A correct inference is referred to as a Cache Hit in Step 690. In addition or along with the confirm message, the IC 430 may send additional information, such as the issuing bank of the card.

If the inferred application is correct, in Step 690, then control of the process, along with the application identifier corresponding to the card brand/card type, is passed to the Initiate Options Module 330, in Step 700. An application Cache Hit or correct inference of application can yield over 2× speed increases over common application selection mechanisms.

If a reject inference message is received from the IC 430 (No in Step 690), the process proceeds to an Optimize Step 710, in which the processing device 440 determines whether to make another inference by returning to the Selecting Step 650, or proceed to the Fast Directory Discovery Automator 640. The processor 440 may keep a count of incorrect guesses during processing of each payment card 410 at the Optimize Step 770, under the control of the software defining the EMV Kernel Vector, to use in determining whether to guess again or not.

It is possible that in a particular implementation, an additional guess with a Guess Automator 610, 620, 630 may not yield processing time improvements, as compared to going to the Fast Directory Discovery Automator 640. In that case, the Optimize Step 640 is configured to go to the Fast Directory Discovery Automator 640 after one incorrect guess.

If the Optimize Step 13 is configured to direct the process back to the Select Step 650 after one incorrect guess, the Select Step 650 determines which one of the Guess Automators 610, 620, 630 to activate. The determination may be made based on a second count kept by the processor 440 in the Select Step 650. In this example, the Discovery Module 320 is configured to activate the Total Market Share Automator 610 again after one incorrect guess. The second inference after a first incorrect inference may be the card brand/type having the second highest market share, for example. Subsequent guesses may be made by the Total Market Share Automator 610 of card brands/types having lower market shares after subsequent incorrect guesses.

Alternatively, after one or a predetermined number of incorrect inferences by the Total Market Share Guess Automator 610, another one of the Guess Automators may be selected to make an inference, such as the Merchant Share Automator 620. In this example, it is assumed that the second inference by the Market Share Guess Automator 610 is incorrect and that after two incorrect guesses by the Total Market Share Guess Automator, the Optimize Step 710 returns the process to the Select Step 650, which selects the Merchant Share Automator 620 in Step 650.

The Merchant Share Guess Automator 620 infers the application on the IC 430 for the card brand/card type most commonly used by the merchant, in Step 720. It is noted that the Merchant Share Guess Automator 620 may also be selected to make the first inference in Step 650.

The inference is sent to the IC 430 in Step 670 and a response is received in Step 680, as above. If the response is a Cache Hit in Step 690, the application identifier corresponding to the inferred card brand/type is forwarded to the Initiate Options Module 330, in Step 700. If the response is a Cache Miss (No in Step 690), then the process returns to the Optimize Step 710.

The Optimize Step 710 may direct the process back to the Selection Step 650, to make another guess by the Merchant Share Guess Automator 620. In the second guess, the card brand/card type having the second highest market share with the merchant, for example, may be inferred. Alternatively, the Total Market Share Guess Automator 610 may be selected to make a fourth inference.

In the present example, after three incorrect inferences, as counted in the Optimize Step 710, the process is directed to the Fast Directory Discovery Automator 640. The count and the pattern of inferences by the different Automators in the Discovery Module 320 may be based on or changed in light of the experience at a respective location. Operation of the Fast Directory Discovery Automator 640 is discussed above.

If the merchant or store has a predetermined relationship with a card brand or a card and card issuer, for example, the Discovery Module 320 is configured to select the Manual Guess Automator, in Step 650. The Manual Guess Automator 630 is configured to cause the processor to infer the known card brand/card type, in Step 730. The inference is sent to the IC 430, in Step 670. A response is received in Step 680, which should be a Cache Hit (Yes in Step 690). The application identifier corresponding to the card brand and card type are sent to the Initiate Options Module, in Step 700.

If the received response is a Cache Miss (No in Step 690), then the merchant 102 may have ended its relationship with the particular card brand, or example. The Optimize Step 710 may then direct the process to the Fast Directory Discovery Automator 640, or to the Select Step 650 to make another inference with another one of the Guess Automators 610, 620.

Initiate Options

Figure 7A:
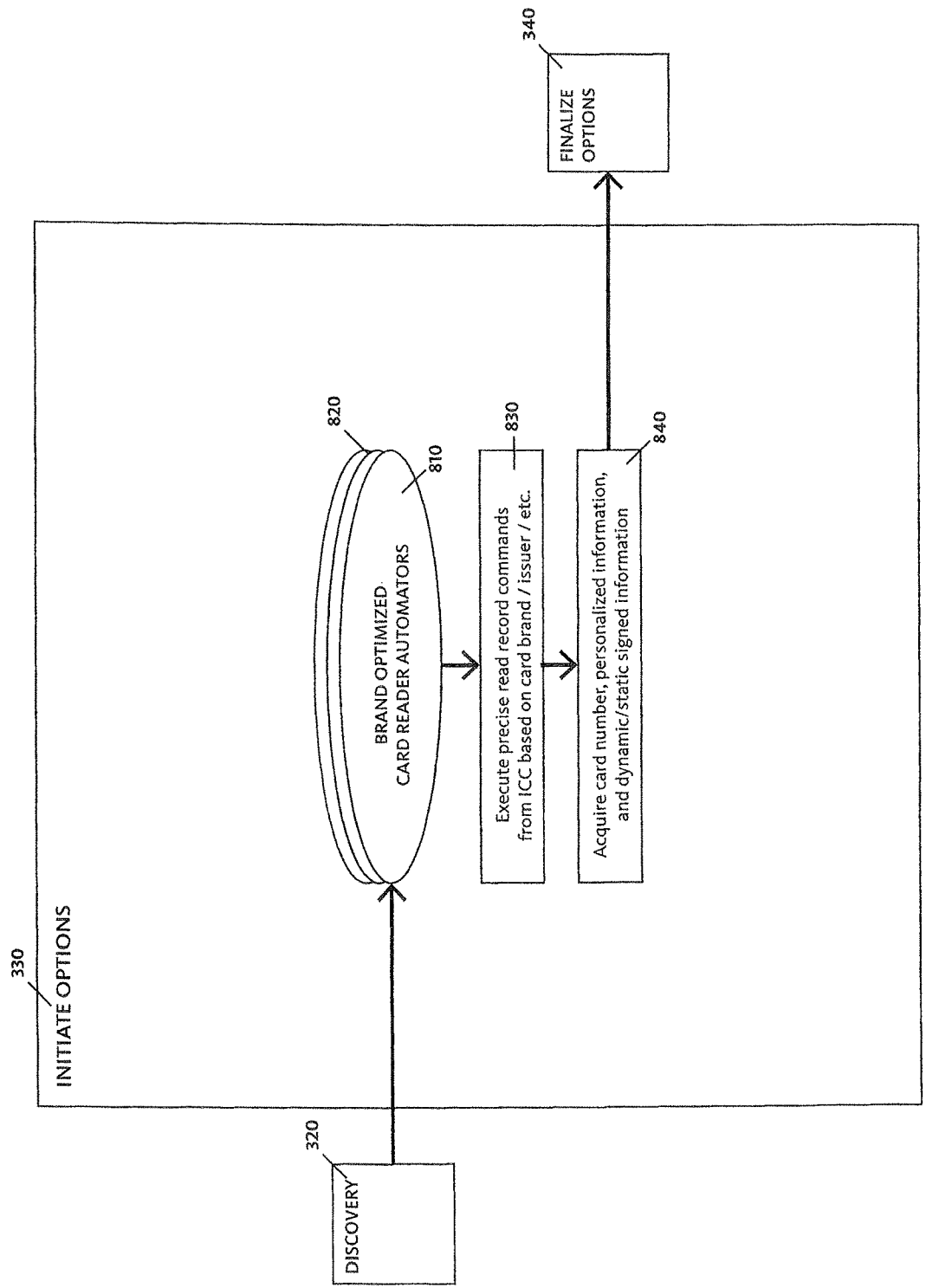
FIG. 7A is an example of a flowchart of a Initiate Options Module of FIG. 3, in accordance with an embodiment of the invention.

FIG. 7A is a functional overview of the operation of an example of the Initiate Options Module 330 of FIG. 3, which facilitates acquisition of the card number and personalized card information related to the payment card 410 being processed, in accordance with an embodiment of the invention. The Initiate Options Module 330 improves the operations related to the Read Card Options step of FIG. 2, so that it operates faster, increasing the speed of processing the payment card 410.

Using the card brand/card type application identifier corresponding to the card brand and card type of the payment card 410, that is output from the Discovery Module 320, the Initiate Options Module 330 selects a corresponding Brand Optimized Card Reader Automator 810 from among available Brand Optimized Card Reader Automators 820 stored by the PIN pad 400. The Brand Optimized Card Reader Automators 820 may also be dependent on card type, for example. The Initiate Options module 330 decreases the amount of work required to obtain the account number and personalized information from the IC 430 of the payment card 410, based on the card brand application determined by the Discovery Module 320. Reads are reduced and processing speeds are further reduced.

The Brand Optimized Card Read Automators 820 facilitate the efficient record reading of the IC 430 by the processor 440 of the PIN pad 400. An up to date Card Read Automator 820 is maintained for each card brand/card issuer combination. Each Brand Optimized Card Read Automator 820 is programmed with an accurate fingerprint or map of the locations of the records that exist on a given IC 430 for each card brand, card type, and/or card issuer combination. New Brand Optimized Card Reader Automators may be provided by the gateway 108 as card brands are added and card information changes.

When searching for a specific tag or card property on the IC 430 using the retrieved map by the Brand Optimized Card Read Automator 810, the Initiate Options Module 330 executes precise 'Read Record' commands to the IC 430, as indicated in block 830 of FIG. 7A. The card number and personalized information may thereby be readily acquired and, as indicated in block 840, and output to the Finalization Options Module 340, as indicated in block 840, without making unnecessary reads of the IC. Card information may include discretionary data, a cardholder's name, a card expiration date, a customer's PIN verification Key, a PIN Verification value, a card verification value (CVV), a card verification code, and/or signed data (signed static data and/or signed dynamic data, for example). Card information may be selectively read and acquired as needed in this or other modules. For example, signed static information and signed dynamic information, which is used in card validation, may be acquired from the IC 430 here, or in the optional Card Validation Module 360, if needed. In the Read Card option step of FIG. 2, in contrast, each record of the IC is read. The reduction of numerous round trip 'Read Record' commands greatly reduces the time to read card options.

Figure 7B:
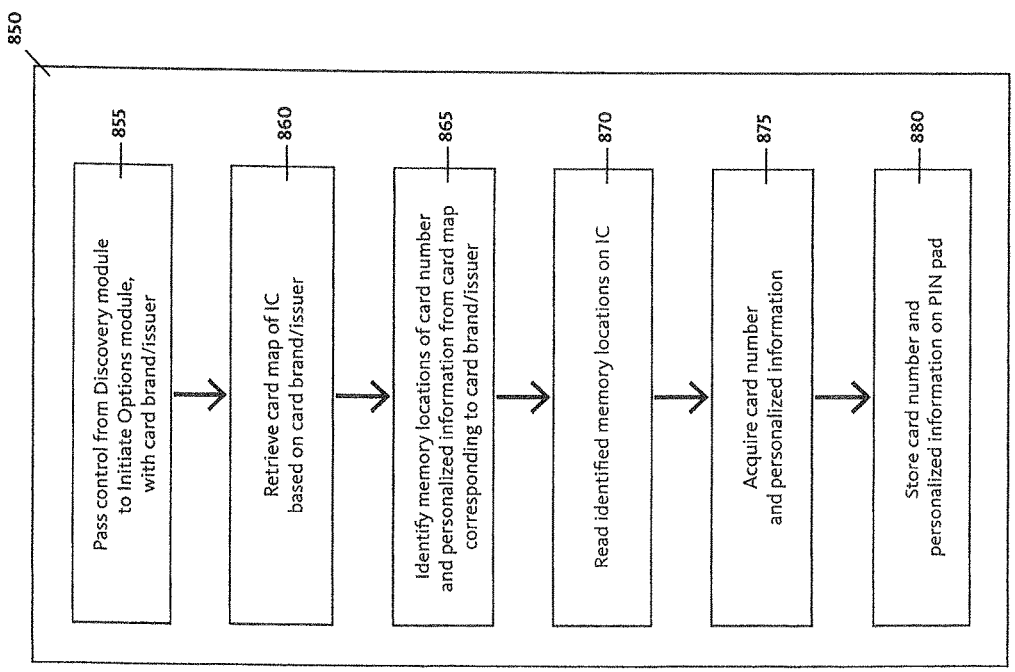
FIG. 7B is a flowchart of an example of a process for reading a payment card by the Initiate Option Module of FIG. 7B, in accordance with an embodiment of the invention.

FIG. 7B is a more detailed flowchart 850 of an example of the operation of the Initiate Options Module 330, in accordance with an embodiment of the invention. Control is passed to the Initiate Options Module 330 from the Discovery Module 320 of FIG. 7A, along with the card brand/card type, and issuer, identified by the Discovery Module, in Step 855.

A card map of the IC 430 based on the card brand/card issuer is retrieved, in Step 860. The precise record locations on the IC 430 of the card number, card information, signed static information, and signed dynamic information are identified on the map, in Step 865. The identified memory locations of the IC 430 are read by the processor 440 of the PIN pad 400, in Step 870. The card account number and personalized information are acquired from the IC in Step 875, and stored in memory of the PIN pad 400, in Step 880. The card number and personalized information are thereby available for use by the Finalize Option Module 340.

Finalize Options

Returning to FIG. 3, the Finalize Options Module 340 follows the Initiate Options Module 330. This module does not relate to an existing EMV step in FIG. 2. A single automator, the Hierarchical Option Stack Automator 900, is used in conjunction with a Hierarchical Options Stack 350, which is discussed below with relation to FIGS. 8A and 8B.

A. Hierarchical Option Stack Automator

Any one or all of the parties involved in the transaction may have a general processing requirements or a processing requirements related to a respective payment card. The payment gateway 108 may also determine that the processing of certain payment cards should be subject to additional requirements. In some cases, the requirements for different parties may conflict. The requirements of different parties are prioritized in a Hierarchical Options Stack ("HOS") 350 to resolve conflicts, in accordance with an embodiment of the invention. The requirements for each party are referred to as "options" here because a requirement of one party may be superseded by a requirement of another party in the HOS 350. An HOS Automator 900 leverages the Hierarchical Option Stack ("HOS") to configure brand, issuer, and card level options for the card being processed. These card specific options enable the PIN pad 400 to determine, for each card being processed, whether the optional Card Validation module 360, which follows the Finalize Options Module 340, may be bypassed during processing of the payment card. Bypassing the Card Validation Module 360 would speed processing. If the options in the HOS 350 require that the payment card used in the current transaction must be processed in accordance with a full online transaction for security reasons or to update the card via issuer scripts, for example, processing would take longer.

B. Hierarchical Option Stack

Figure 8A:
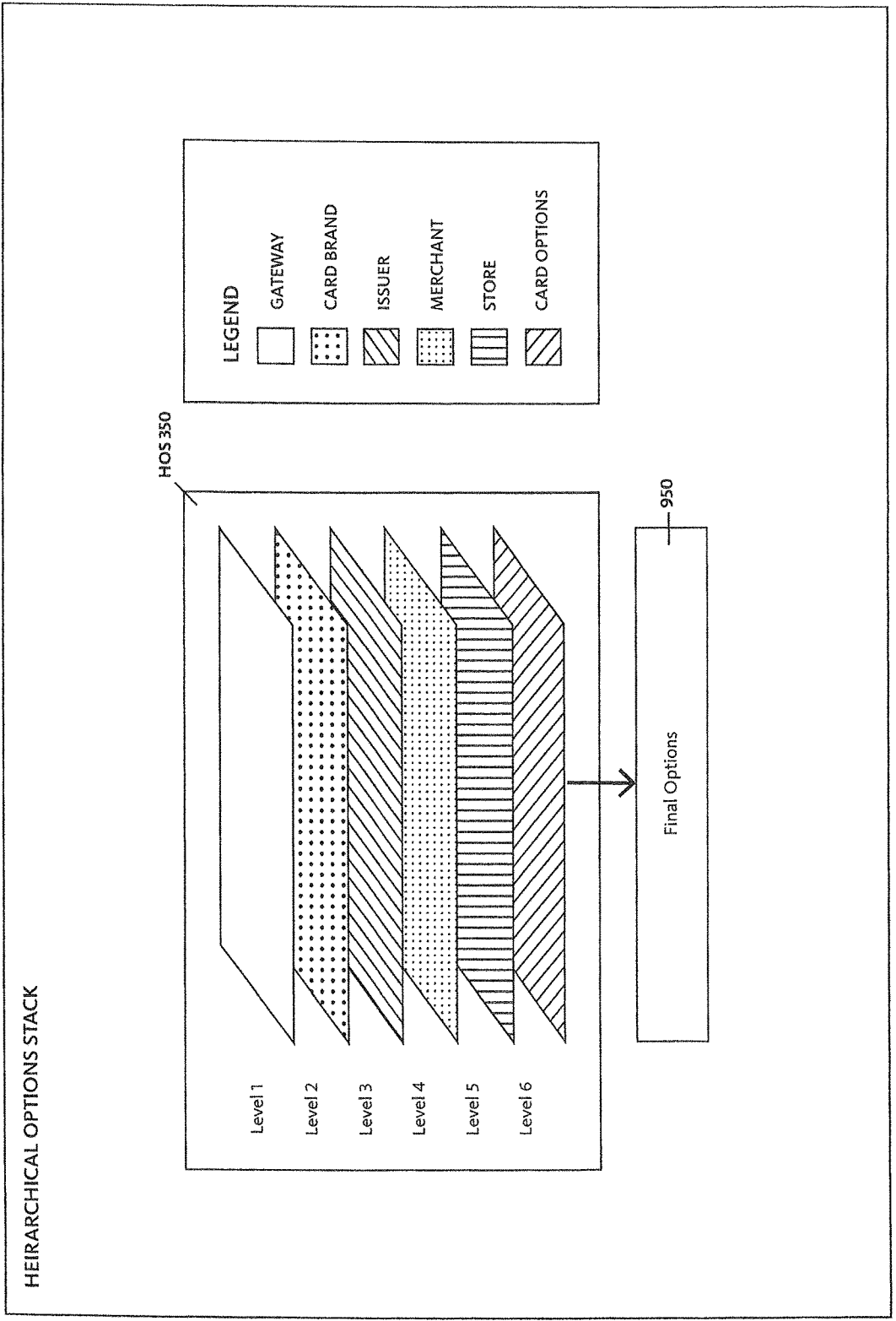
FIG. 8A is a schematic representation of a Hierarchical Options Stack of FIG. 3, in accordance with an embodiment of the invention.

The HOS 350 provides fine grain tuning and control of the transaction pipeline. FIG. 7A is a schematic representation of an example of an HOS 350, in accordance with an embodiment of the invention. The HOS 350 stacks multiple layers of option configurations to deliver a per card option configuration. The options for each party may be stored in a separate file. A general or case specific requirements of the gateway 108, the card brand 114 (Visa in FIG. 7A, for example), the issuing bank 116, the merchant 102, the store 102, and/or the payment card 410 itself, for example. Each party in the HOS 350 stack may have one or more files of options, as shown in FIG. 8A. While only one file for the card brand 114 and one file for the issuing bank 116 are shown, it should be understood that each card brand and issuing bank that can be processed by the PIN pad 400 can have their own, separate files. Each Level 1-6 in the HOS Stack 350 is checked during each transaction. In addition, if the payment gateway 108 has instituted a requirement for all Visa credit cards, for example, that requirement would be in a brand level file (Level 2) for Visa.

Examples of options are specified in the following hierarchical order in FIG. 8A to reflect the priority of the respective options by different parties to the transaction:
1. Payment Gateway 108 Options—the default options for the payment processor applied to all things if they are not overridden.
2. Card Brand 114 Options—the card brands (Visa, Mastercard, Discover, etc.) default options which apply to all cards belonging to the brand (Level 2).
3. Issuer 116 Options—the default options of the issuing bank for all cards belonging to the issuer (Level 3).
4. Merchant 104 Options—the default options for the merchant for all cards used at a particular retailer's store (Level 4).
5. Store 106 Options—the default options of the store where the transaction is taking place (Level 5).
6. Card 410 Options—a set of options that are set per card number as identified by the card number (PAN) (Level 6).

Figure 8B:
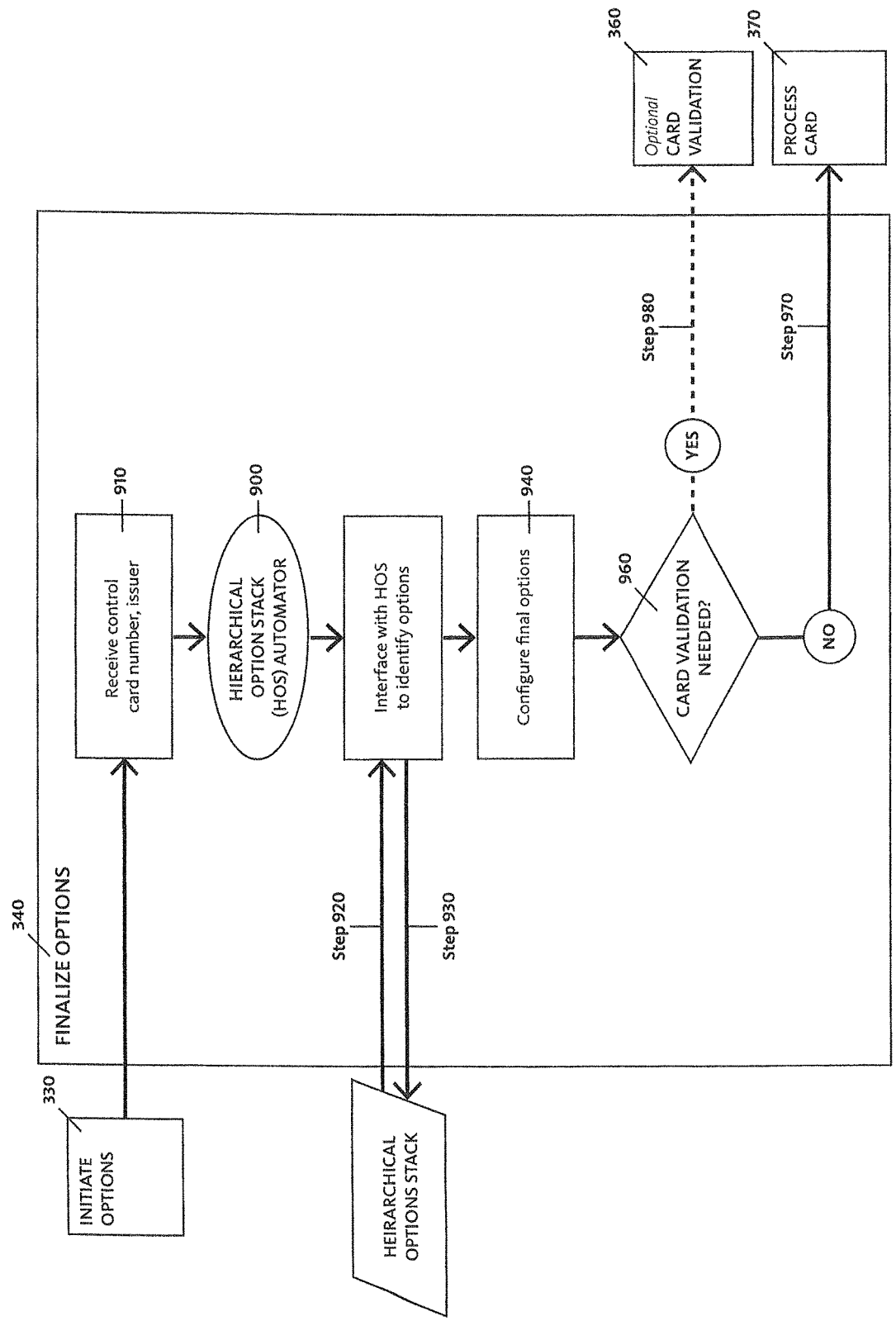
FIG. 8B is a flowchart of an example of the operation of the Finalize Options Module of FIG. 3, in accordance with an embodiment of the invention.

Options in different levels of the HOS 350 for a given payment card 410 are shown stacked in FIG. 7A from Level 1 to Level 6, in a descending hierarchy. Options at a lower level of the hierarchy will override conflicting options at a higher level in the hierarchy. In this manner card brands preferences (Level 2) may be overridden by other defaults or options attached to a specific card number in card options in Level 1, for example. Card options (Level 6) from a respective payment card 410 may override all other options configurations in Levels 1-5. Resolved options for the plurality of parties in the HOS 350 are stored in a Finalize Options file 950 in this example, as shown in FIG. 8B.

In one example, the issuing bank 116 may require that their issued cards be checked more carefully by a full online validation process. This may be specified in the issuing bank's file in the HOS 350. In another example, Visa or MasterCard may flag particular cards for online validation due to suspicious activity, for example. In another example, if Visa or MC has been hacked, then they may also require that all of their cards be validated with a full online validation process for a period of time. Specific card numbers and/or card holders may also be flagged in the HOS 350 by any of the parties for full online validation.

Given the extremely large number of EMV payment cards in circulation, creating, distributing and analyzing a per card configuration file is not practical. Instead of keeping track of per card configuration, per option feature files are maintained that indicate cards that are members of an option feature. For example if a card needs to be updated by an issuer script it is added to the "needs update" feature file.

In one example, a "force online" feature may be used to implement a card level blacklist in the Card Options file that forces bad cards into a full online transaction validation mode. To support this at some scale, algorithms are used to densely encode these files in the HOS 350. If, for example, there were 100 k cards with the "force online" feature the resulting feature file would take about 80 KB and have an approximate yield a 1% false positive error rate. To support 1 million cards the feature file would require 120 KB of space to yield the same correctness.

Another example is in implementing heuristics to determine processing options for certain cards. For example, if any of the parties to the transaction shown in FIG. 1 realize that a certain issuer's cards are associated with a higher fraud rate, the Card Options file for that party can in the HOS 350 may be used to indicate that those cards must be processed in a "full online" manner. Or, for example, a party's Options file may indicate that every nth card must be processed online.

Options may be provided by multiple parties that may differ based on many card brand/issuing bank combinations, as well as whether the card is a credit card, debit card, or EBT/eWIC card. Options may also vary based on card number and/or card holder. An efficient search technique may therefore provided to find applicable options for a respective card. For example, the HOS Automator 900 may include Bloom filters to determine which feature files a card belongs to during the EMV transaction. As is known in the art, Bloom filters are data sets designed to provide a fast, memory-efficient lookup result when determining if an item is part of a set. For example, Bloom filters are used to quickly identify the options specific to a given card.

FIG. 8B is a flowchart of an example of the operation of the Finalize Options Module 340. The Finalize Options Module 340 receives control of the process, along with the card brand, card number, card issuer, and personalized information from the Initial Options Module 330, in Step 910. The processor 440 interfaces with the HOS 350 to check each of the files for options applicable to the current payment card, in Step 920.

The options in each file are searched and applicable options retrieved, in Step 930. The options are configured in Step 940 to create a final options file 950 for the payment card being processed. The final options file is shown schematically in FIG. 8A.

The processor 440 analyzes the final options file 950 to determine whether any of the parties in Level 1-Level 6 in the HOS 350 require validation of the payment card 410, in Step 960. If No, then control of the process 300 is passed to the Process Card Module 370, in Step 970. If Yes, the process proceeds to the Option Card Validation Module 360, in Step 980.

Card Validation Module

Figure 9:
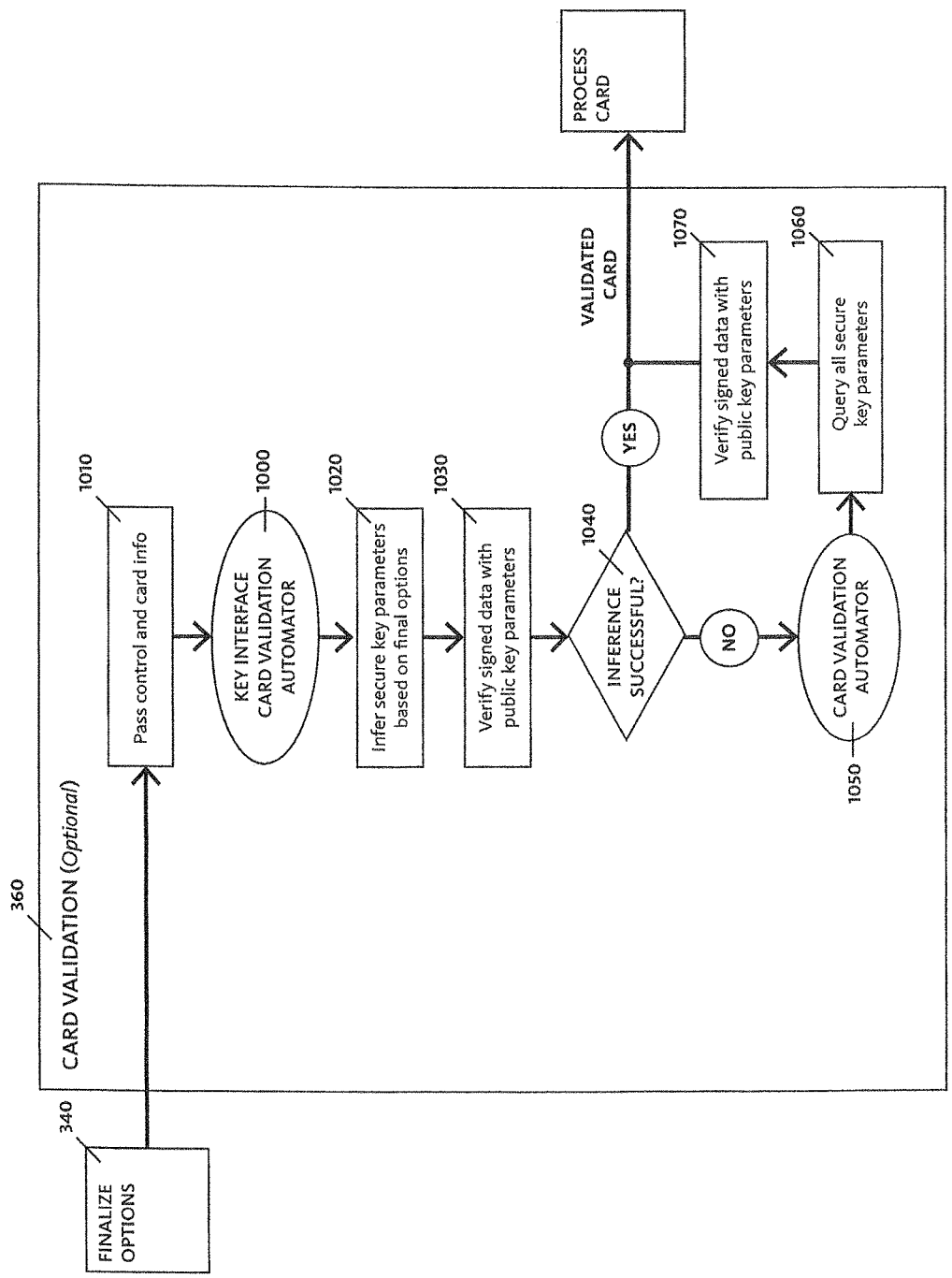
FIG. 9 is a flowchart of an example of the operation of the Optional Card Validation Module of FIG. 3, in accordance with an embodiment of the invention.
Figure 10:
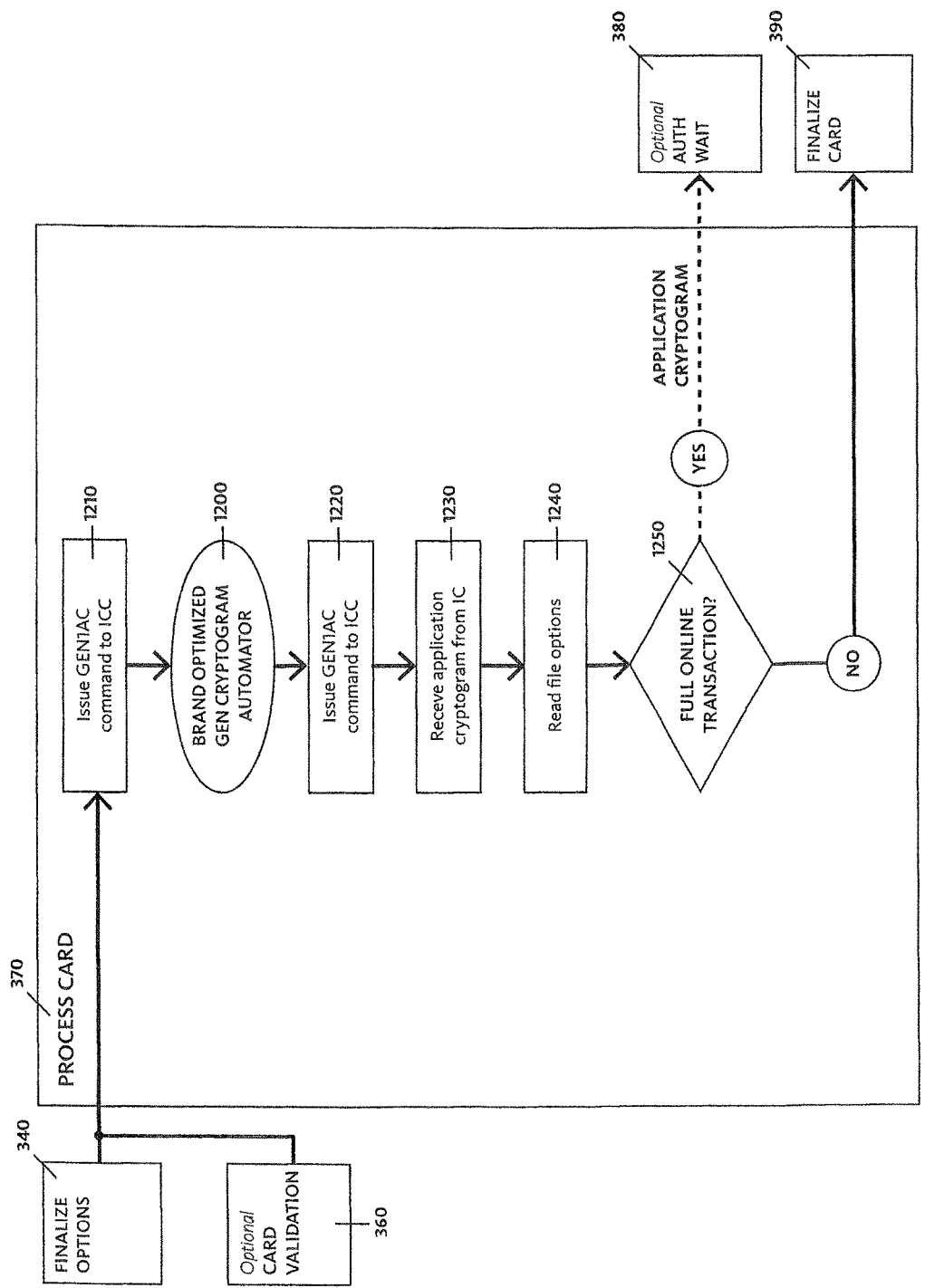
FIG. 10 is a flowchart of an example of the Process Card Module of FIG. 3, in accordance with an embodiment of the invention.

FIG. 9 is a block diagram of an example of the Card Validation Module 360, in accordance with an embodiment of the invention. The Card Validation Module 360 is an optional module that is responsible for performing Offline Data Authentication ("ODA"), as in step 225 of FIG. 2. As used herein, the term "optional" means that a module will be activated or bypassed based on determinations made in the prior module, here the Finalize Options Module 340. The Card Validation Module 360 is invoked if the Finalize Options Module 340 indicates that extra authentication is necessary for the current payment card 410, in Step 960 of FIG. 8B, as discussed above.

As discussed above, in the EMV transaction process 200 of FIG. 2, the terminal or PIN pad queries IC for all the public key parameters (key index, exponent, remainder) that are stored on the terminal/PIN pad, resulting in a loss of transaction speed. The Key Inference Card Validation Automator 1000 in the Card Validation Module 360 attempts to perform a faster ODA than the prior art by inferring the applicable public key parameters (key index, exponent, remainder) from among the key parameter stored on the PIN pad, based on card information from the present payment card 410, such as the card brand, card type, issuing bank, as well as security information related to payment cards 410 that have been recently processed. As is known in the art, card issuers and certification authorities provide public key parameters to PIN pads for use in validating smart payment cards, such as EMV cards.

As shown in FIG. 9, control of the process passes from the Finalize Options Module 340 to the Key Inference Card Validation Automator 1000, in Step 1010. Card information obtained from the present payment card 410, including the card brand, card type, the issuing bank, personalized information, signed static information, and signed dynamic information, which have been acquired from the IC 430 in sets of key parameters stored on the PIN pad prior modules, is also passed to the Key Inference Card Validation Automator 1000, in Step 1010.

A set of public key parameters, including a key index, key exponent, and key remainder, for the current payment card being processed, are inferred from among the key parameters available on the PIN pad, in Step 1020. The inference may be based on the card information of the current payment card 410, including the card brand and card type, and the public key parameters of recently processed cards of the same card brand and card type stored on the PIN pad 400.

In one example, a priority inference table is created by the processor 440 of the PIN pad 400, based on historical card use with the respective PIN pad 400. If the last X cards processed were Visa/Chase credit cards and the content payment card is a Visa/Chase credit card, for example, then the inference would be based, in part, on the secure parameters of those Visa/Chase credit cards. X may be 10 or another number, for example. It may be found during operation that X may be larger or smaller than 10, and it may be found during operation by the processor 440 of the PIN pad 400, the gateway 108, or the PIN pad provider, for example, that a different number would provide better results.

If the card brand/card type of the current payment card 410 is not a Visa/Chase card in this example, then historical data for the combination of recently processed card brand/card type of the current payment card is used to make the inference. The priority inference table is dynamically updated as payment cards are processed to increase the probability of a correct guess. The inference priority table may also be based on the market share, merchant/store share, or known relationships between a merchant and a card brand, for example, as discussed above with respect to the Guess Automators 610, 620, 630 of the Discovery Module 320. It is noted that a priority table as described with respect to the Card Validation Module 360 could also be used in the Discovery Module 320, instead of or in addition to any or all of the Guess Automators 610, 620, 630.

The inferred public key parameters are used to verify the signed static data and/or the signed dynamic data obtained from the IC 430 by the Initiate Options Module 330 in FIGS. 7A and 7B. If the signed data can be verified by the inferred key parameters, in Step 1030, then the inferred key parameters are determined to be correct, in Step 1040 and the payment card 410 is considered to be valid, as indicated in FIG. 9. Control of the process is passed to the Process Card Module 370. A correct inference results in considerable speed gains in the form of round trip 'Read Record' commands that no longer need be sent to the IC 430 of the payment card 410. Assuming two records need to be read, about 120 ms may be saved.

If the inference is not successful, then the signed data cannot be verified. Another inference may be made or the Card Validation Automator 1050 may be activated to query the IC 430 with all public key parameters stored on the PIN pad 400, as in the prior art, in Step 1060 to identify the applicable set of public key parameters. Key parameters confirmed by the IC 430 are used by the PIN pad 400 to verify the signed data, in Step 1070. If the signed data is successfully verified, the card is considered to be valid data and control of the process is passed to the Process Card Module 370, as above. If the signed data cannot be verified, the card is considered to be invalid, the card is rejected, and an alternative form of payment is requested.

Process Card Module

Figure 2:
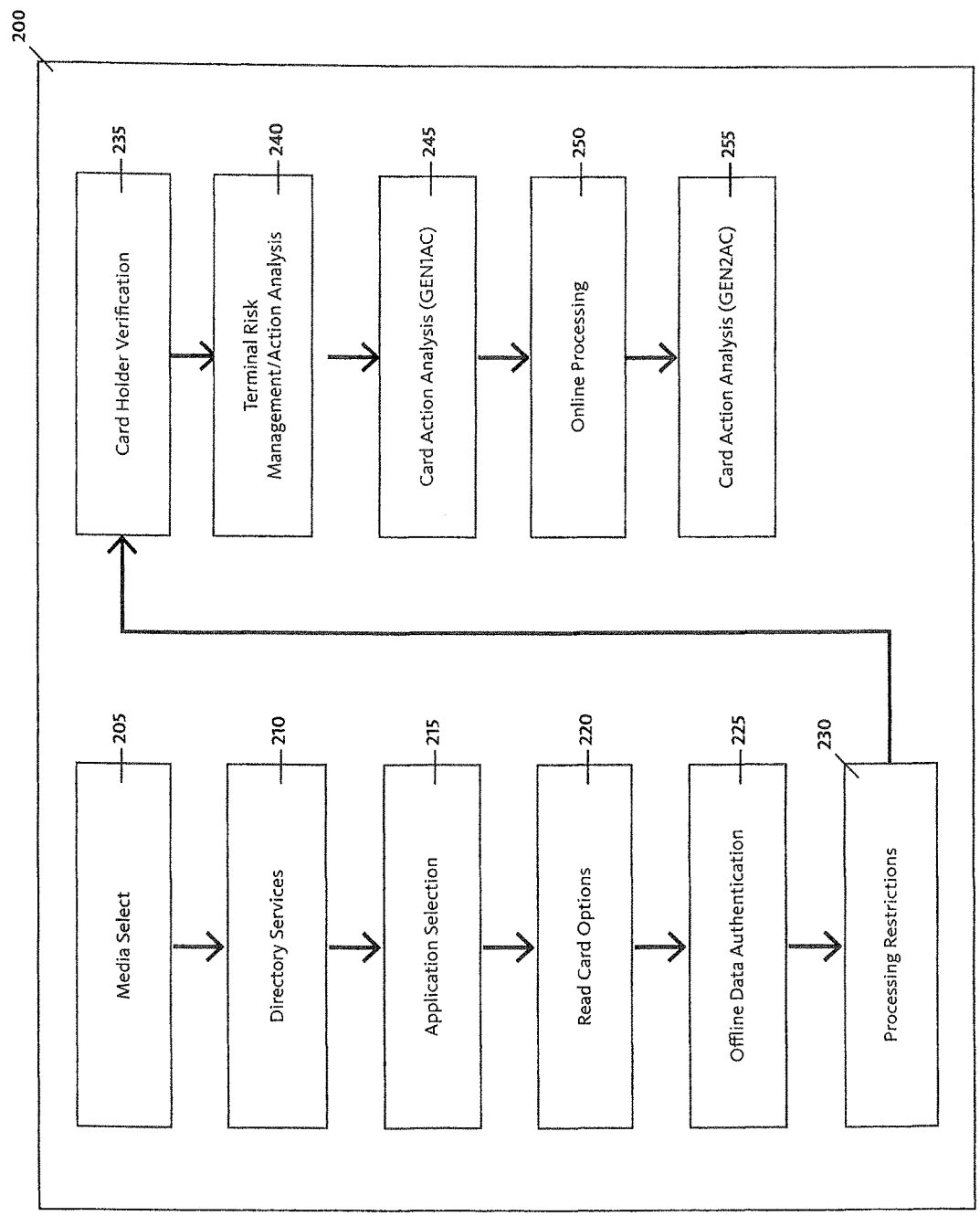
FIG. 2 is a block diagram of a typical EMV transaction process, as is known in the art.
Figure 11:
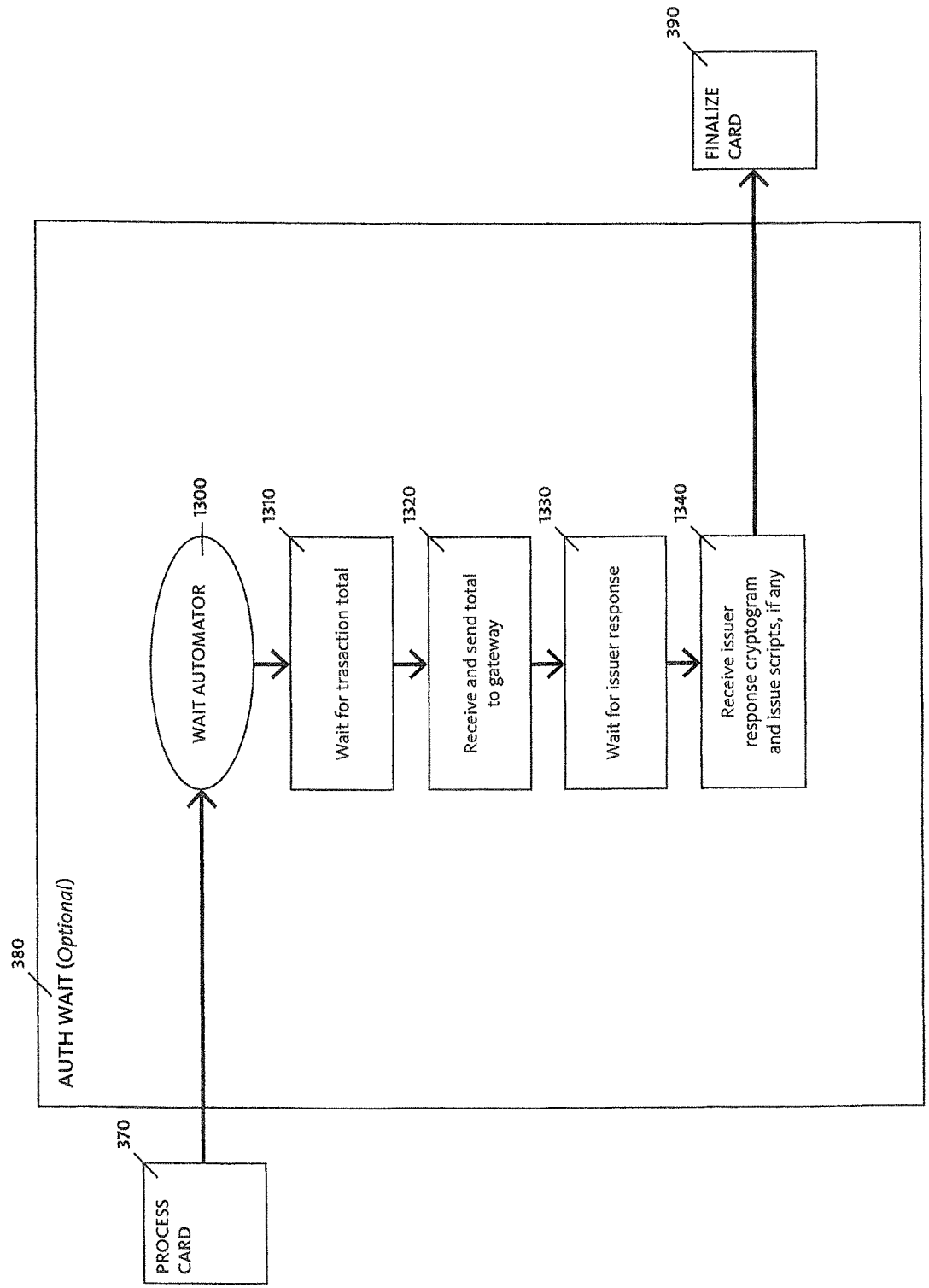
FIG. 11 is a flowchart of an example of the Authorization Wait Module of FIG. 3, in accordance with an embodiment of the invention.

The Process Card Module 370 in FIG. 11 performs functions related to the Card Action Analysis (GEN1 AC) step 245 of FIG. 2.

The Brand Optimized Gen Cryptogram Automator 1200 automates the GEN1 AC flow. The Brand Optimized Gen Cryptogram Automator 1200 contains a respective fingerprint or map of information on the IC 430, for the brand of the card, identifying the dynamic (transaction related) and static (card related) elements necessary for cryptogram generation for that brand. The map may be the same or a different map than the map discussed above with respect to the Brand Optimized Module 330. The map enhances the accuracy of the current GEN1 AC command based on prior successful GEN1 AC commands for the same card brand/card type.

Control is passed to a Brand Optimized Gen Cryptogram Automator 1200, along with card related information and transaction related information, in Step 1210. As discussed above with respect the FastEMV process, a random transaction amount is used in this step. The Brand Optimized Gen Cryptogram Automator 1200 initiates processing of the payment card 410 by issuing a GEN1 AC command to the IC 430, in Step 1220. It is noted that if the total transaction amount is available at this time, it may be used.

In response, the IC 430 generates an Authorization Cryptogram based on both static Data Objects related to the card information and dynamic data objects related to the transaction including the random transaction amount), as is known in the art.

The Final Options file 950 from the Initiate Options Module 330 and FIGS. 7A and 7B, is read in Step 1240 to determine if any of the parties in the HOS stack 350 require full online transaction processing of the payment card 410, in Step 1250. If not (No in Step 1240), the process moves to the Finalize Card Module 390. If Yes in Step 1240, the process proceeds to the optional Authorization Wait Module 380.

Authorization Wait Module

The optional Authorization Wait Module 380 performs functions related to the Online Processing step 250 of FIG. 2. The Authorization Wait Module 380, if invoked, uses a Wait Automator 1300 to wait for final cashier totals in Step 1310, which is received by the processor 440 of the PIN pad 400 and sent to the issuing bank 116 via the gateway 108, in Step 1320. The processor 440 waits for the response from the issuing bank 116, in Step 1330. The response is received in the form of a cryptogram, as well as card counter updates and issuer scripts, if any, in Step 1340. Control of the process is then passed to the Finalize Card Module 390.

Finalize Card Module

Figure 12:
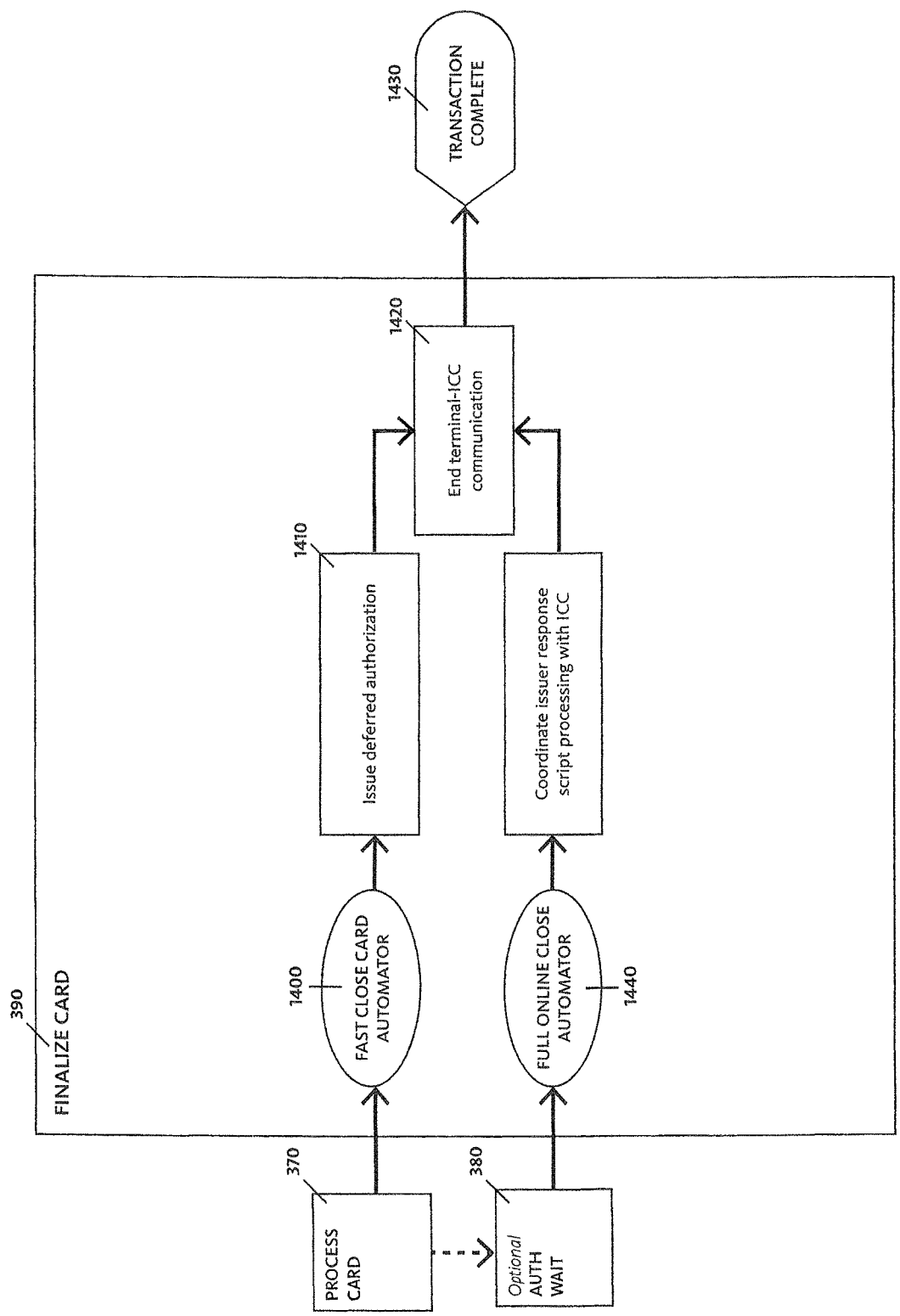
FIG. 12 is a flowchart of an example of the Finalize Card Module of FIG. 3, in accordance with an embodiment of the invention.

The Finalize Card Module 390 performs functions related to the Card Action Analysis (GEN2 AC) Step of FIG. 2. Control of the process may pass directly from the Process Card Module 370, if full online processing is not needed, or from the Authorization Wait Module 380 if full online transaction processing is needed, as shown in FIG. 12.

The Fast Close Card Automator 1400, which directly follows the Process Card Module 370 when the Authorization Wait Module 380 is not needed, follows the standard FastEMV flow and issues a Deferred Authorization to the IC 430 in Step 1410, indicating that processing of the payment card 410 will be completed without going online for full online transaction processing, and without a transaction total. Communication between the PIN pad 400 and the IC 430 ends in Step 1420 and the transaction is complete in Step 1430.

The Finalize Card Module 390 also includes a Full Online Automator 1440, which receives control of the process from the optional Authorization Wait Module 380 when full online processing is needed. The Full Close Card Automator 1440 is responsible for fallback to a full insert EMV transaction, coordinating issuer response script processing with the IC 430. It is driven as needed by the issuing bank 116. As a consequence, it depends on the issuer cryptogram including updated counters and issuer scripts to be provided as part of passed in transaction options.

In Step 1450, the Full Online Automator 1440 receives the response from the card issuer 116, which includes a transaction approval or denial code. Also in Step 1450, the Full Online Automator 1440 coordinates any scripts provided by the issuing bank 116 in the Authorization Wait Module 380 in Step 1340 of FIG. 11. Communication between the PIN pad 400 and the IC 430 is then terminated, in Step 1420 and transaction is complete, in Step 1430.

The Full Close Card Automator 1440 may be useful for international use of the EMV Vector Kernel process 300, where script processing is especially useful (offline PIN CVM, for example).

Applicability to International EMV

In international markets, EMV was implemented as a way to ensure card payment security under conditions where a full online transaction may not be possible (e.g., due to an intermittent internet connection). In the traditional EMV model, payment cards are updated by issuer scripts when they are able to perform a full online transaction, which results in a slow transaction speed but allows for the "offline" processing of the card As discussed above, the Fast EMV enhancements increase overall transaction speed but sacrifice some of the features needed in international markets, such as updataing a payment card using issuer scripts. The EMV Vector Kernel 300, in accordance with embodiments of the invention, is extendible to the international market through use of Bloom filters, for example, for determining card options that can dynamically determine whether a payment card needs to be processed fully online or with other options. In international markets, this allows the EMV Vector Kernel 300 to ensure a FastEMV transaction while simultaneously processing each card depending on its unique parameters.

Examples of Transaction Flows Using the Vector EMV Process in Accordance with Embodiments of the Invention Optimal Fastpath/Trusted Card:

The "optimal fastpath" example in accordance with an embodiment of the invention refers to processing a card with no overrides and taking full advantage of all speed improvements provided by the EMV Vector Kernel process 300 of FIG. 3. In this case the process 300 proceeds through the following modules:

1. Setup Module 310: proceeds as normal;
2. Discovery Module 320: results in a correct first guess;
3. Initiate Option Module 330: Uses a brand-optimized automator;
4. Finalize Options Module 340: Hierarchical Options Stack (HOS) 350 results in use of Default configuration (1) card validation is not needed, 2) no full online transaction in provided in the HOS 350, and 3) 10 and 2) are not overridden);
5. Card Validation Module 340: Skipped;
6. Process Card Module 370: Proceeds without requiring a full online transaction;
7. Authorization Wait Module 380: Skipped; and
8. Finalize Card Module 390: Utilizes Fast Close Card Automator 1400 to issue a deferred authorization to the card.

Such a transaction flow is faster than a conventional EMV transaction and is faster than FastEMV transaction of the prior art.

Trusted Card Needing Update:

In this example it is assumed that the issuing bank 116 communicates to the payment gateway 108 during prior EMV processing of the same payment card 410 at an earlier time, that the payment card 410 needs an update. The payment gateway 108 sends an update to the HOS 350 to the issuer file in the HOS (Level 3) for the next time the card is presented. On that subsequent transaction with the same payment card 410:

1. Setup Module 310: proceeds as normal;
2. Discovery Module 320: Ideally results in a correct first guess;
3. Initiate Options Module 330: Uses a brand-optimized automator;
4. Finalize Options Module 340: HOS 350 results in match for card needing update. This triggers a full online transaction in order for issuer scripts to be sent to the card;
5. Card Validation Module 360: Skipped
6. Process Card Module 370: Proceeds with full online transaction because update is needed
7. Authorization Wait Module 380: Uses Wait Automator 1300 to wait for issuer response; and
8. Finalize Card Module 390: Utilizes Full Online Close Card Automator 1440 to ensure issuer scripts are communicated to the card prior to card removal MasterCard Forces Card Validation:

It may be the case that a card brand such as MasterCard, requires additional validation of a card. In this case:
1. Setup Module 310: Proceeds as normal;
2. Discovery Module 320: Ideally results in a correct first guess;
3. Initiate Options Module 330: Uses a brand-optimized automator;
4. Finalize Options Module 340: Hierarchical Options Stack (HOS) 350 results in match that MasterCards need additional validation;
5. Card Validation Module 360: Card validation proceeds, and in the best case involves a correct key inference. The transaction continues if the validation step is passed successfully;
6. Process Card Module 370: Proceeds without requiring a full online transaction;
7. Authorization Wait Module 380: Skipped; and
8. Finalize Card Module 390: Utilizes Fast Close Card Automator 1400 to issue a deferred authorization to the card.

Card Flagged for Validation

The gateway 108 or another party may realize through heuristics, for example, that a particular payment card or series of cards are subject to additional fraud. The HOS 350 is updated to flag these cards. This is similar to previous examples requiring additional validation:
1. Setup Module 310: Proceeds as normal;
2. Discovery Module 320: Ideally results in a correct first guess;
3. Initiate Options Module 330: Uses a brand-optimized automator;
4. Finalize Options Module 340: HOS 350 results in match that the card is part of a set of cards requiring additional validation;
5. Card Validation Module 360: Card validation proceeds, and in the ideal case involves a correct key inference. The transaction continues if the validation step is passed successfully;
6. Process Card Module 370: Proceeds without requiring a full online transaction;
7. Authorization Wait Module 380: Skipped; and
8. Finalize Card Module 390: Utilizes Fast Close Card Automator to issue a deferred authorization to the card.

Merchant Forces a Full-Online Transaction

Some merchants may desire that all EMV cards be processed in a full online fashion. In this example, the traditional GEN2 AC flow is used, while still resulting in some speed gains from other aspects of the EMV Vector Kernel process 300 of FIG. 3:
1. Setup Module 310: Proceeds as normal;
2. Discovery Module 320: Ideally results in a correct first guess;
3. Initiate Options Module 330: Uses a brand-optimized automator;
4. Finalize Options Module 340: HOS 350 results in match that the merchant requires a full online transaction;
5. Card Validation Module 360: Card validation proceeds, and in the ideal case involves a correct key inference based on kernel priority. The transaction continues if the validation step is passed successfully;
6. Process Card Module 370: Proceeds with a full online transaction;
7. Authorization Wait 380: Module Utilizes Wait Automator 1300 to wait for issuer response; and
8. Finalize Card Module 390: Utilizes Full Online Close Card Automator 1440 to ensure card validation online and that any issuer scripts and updates are sent to the card.

Figure 13:
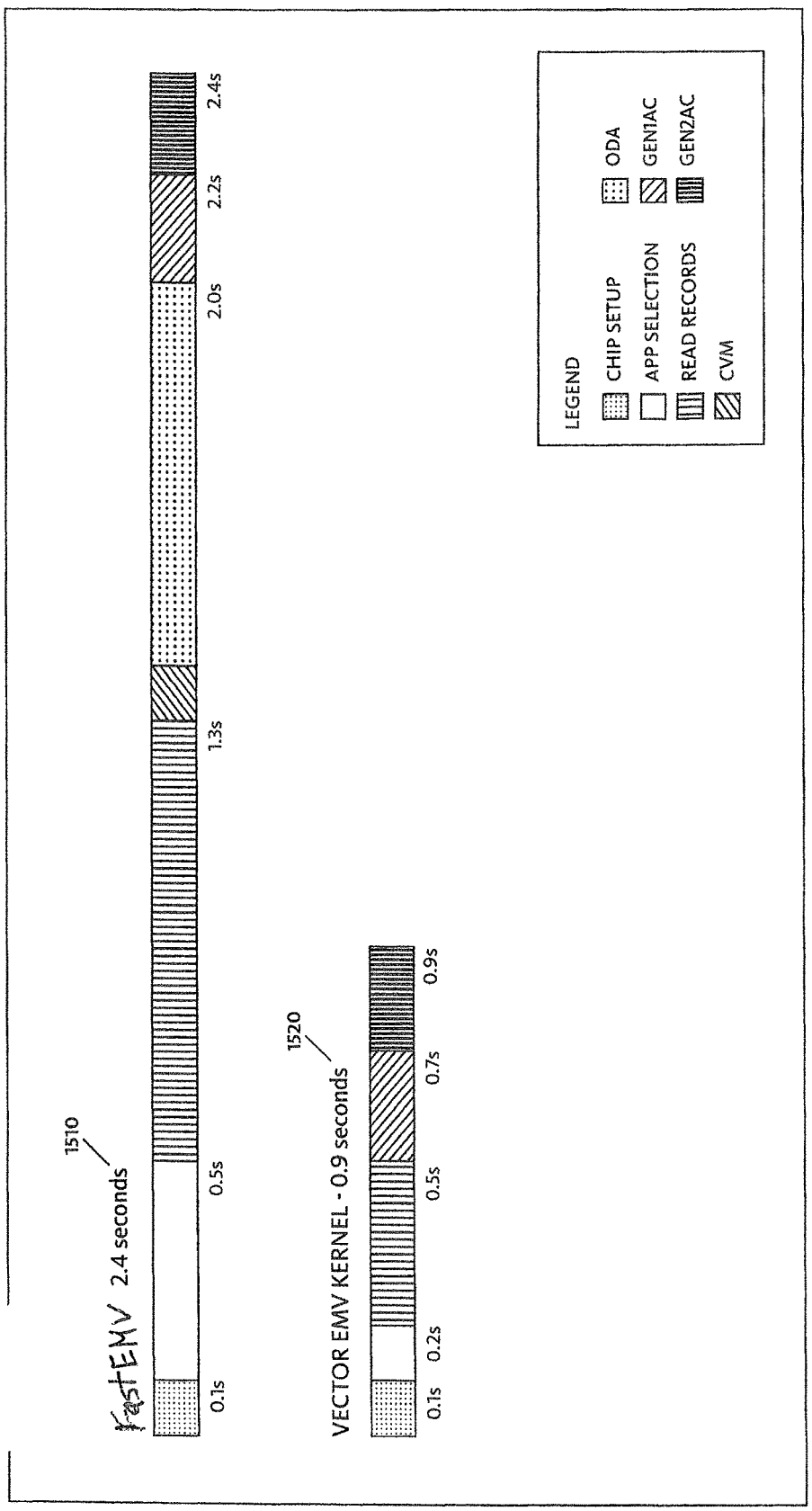
FIG. 13 is a schematic representation of the processing time for the Quick Chip EMV transaction and the EMV Vector Kernel, in accordance with an embodiment of the invention.

FIG. 13 is a comparison between the Fast EMV process of the prior art, in the top timeline, and the EMV Vector Kernel process 300 in accordance with an embodiment of the invention, in the bottom timeline. The FastEMV process, which includes the following steps from FIG. 2: chip setup, application selection, reading records, card validation method, ODA, GEN1 AC, and GEN2 AC, takes 2.4 seconds. The EMV Vector Kernel process 300, applying only the Setup Module 310, the Discovery Module 320, the Initiate Module 330, the Finalize Options Module 340, the Process Card Module 370, and the Finalize Card Module 390 (and not including the optional modules) of FIG. 3 takes only 0.9 seconds. Significant time reductions are provided by the Discovery Module 320 and the Initiate Options Module 340 compared to the corresponding modules of FIG. 2. In addition, ODA is not required in this example of the EMV Vector Kernel process 300.

Examples of implementations of embodiments of the invention are described herein. It would be apparent to one of ordinary skill in the art that modifications may be made to the examples above without departing from the spirit and scope of the invention, which is described in the following claims.

We claim:

1. A method of a PIN pad device performing a transaction with a payment card comprising an integrated circuit, the method comprising:
    supplying power, by the PIN pad device, to an integrated circuit of the payment card;
    reading, by the PIN pad device, the integrated circuit of the payment card with a reader of the PIN pad device;
    inferring, by a processor of the PIN pad device, a card brand and a card type of the payment card comprising:
        selecting a first inference type from among a set of two or more inference types, each inference type using different criteria to infer a probable card brand and a probable card type of the payment card used for the transaction, and
        determining a first inference comprising a first probable card type and a first probable card brand based on the first inference type;
    identifying, by the processor of the PIN pad device, a first application based on a combination of the first probable card brand and the first probable card type;
    sending, by the PIN pad device, a first message containing an identifier of the first application to the integrated circuit without querying the integrated circuit of the payment card for application identifiers associated with card brands or card types;
    receiving, by the PIN pad device, a second message from the integrated circuit, the second message being a confirm message confirming the first application, or a reject message rejecting the first application; and
    in response to determining that the second message is the confirm message, completing, by the PIN pad device, the transaction using the first application.

2. The method of claim 1, wherein selection from among the set of two or more inference types is based on data stored in a memory of the PIN pad device, the data comprising data indicative of:

a first criteria for selection of the first inference type comprising a plurality of total market shares of respective combinations of card brand and card type in a region;
a second criteria for selection of a second inference type comprising a plurality of market shares of respective combinations of card brand and card type for a merchant receiving the payment card; and
a third criteria for selection of a third inference type comprising a known relationship between the merchant and the card brand.

3. The method of claim 2, wherein determining the first inference is based on a total market share of a combination of card brand and card type having a highest market share in the region; and
in response to determining that the second message is the reject message:
determining a second inference based on a second combination of card brand and card type having a second highest market share in the region; or
determining the second inference, based at least in part, on a combination of card brand and card type for the merchant receiving the payment card having a highest market share for the merchant receiving the payment card.

4. The method of claim 2, further comprising:
determining the first inference based on a combination of card brand and card type for the merchant receiving the payment card having a highest market share for the merchant receiving the payment card; and
in response to receiving the reject message, determining a second inference based, at least in part, on a second combination of card brand and card type for the merchant receiving the payment card having a second highest market share for the merchant receiving the payment card.

5. The method of claim 1, further comprising:
inferring the card brand based on a known relationship between a merchant and a card brand.

6. The method of claim 1, wherein, in response to receiving the reject message, the method further comprises:
sending respective third messages to the integrated circuit for each combination of card brand and card type; and
ceasing transmission of the respective third messages when a subsequent confirm message is received.

7. The method of claim 1, wherein after receiving the confirm message, the method further comprises:
reading the integrated circuit based, at least in part, on the card brand and/or a card issuer to acquire a card number and/or card information from the integrated circuit.

8. The method of claim 7, wherein the card information comprises:
a cardholder's name, a card expiration date, a customer's PIN verification key, a PIN verification value, a card verification value, a card verification code, and/or signed data.

9. The method of claim 7, further comprising:
storing information related to two or more of parties comprising: a gateway, a card brand, a card issuer, a merchant, a store, and the payment card;
assigning a relative priority to the two or more parties; and
determining whether to perform card validation to validate the payment card based, at least in part, on stored validation information from the two or more parties, based on the relative priority assigned to each of the two or more parties.

10. The method of claim 9, wherein, when it is determined that the card validation is not required, the method further comprises:
issuing a command to the integrated circuit to generate an authorization cryptogram;
receiving the authorization cryptogram;
determining whether full online transaction is required; and
when the full online transaction is not required, issuing a deferred authorization to the integrated circuit, indicating that the transaction is completed.

11. The method of claim 9, wherein, when card validation is required, the method further comprises:
inferring public key parameters for the payment card based, at least in part, on the card information;
retrieving the inferred public key parameters; and
attempting to verify signed data using the retrieved public key parameters.

12. The method of claim 11, wherein, when the attempt to verify is successful, the method further comprises:
issuing a command to the integrated circuit to generate an authorization cryptogram;
receiving the authorization cryptogram;
determining whether full online transaction is required; and
when full online transaction is not required, issuing a deferred authorization to the integrated circuit, indicating that the transaction is completed.

13. The method of claim 10, wherein, when an attempt to validate is not successful, the method further comprises:
attempting to validate a signed data with all available secure key parameters; and
when the attempt to validate is successful, the method further comprise:
issuing a command to the integrated circuit to generate the authorization cryptogram;
receiving the authorization cryptogram;
determining whether a full online transaction validation is required; and
when the full online transaction validation is not required, issuing a deferred authorization to the integrated circuit, indicating that the transaction is completed.

14. The method of claim 13, wherein in response to determining that full online transaction processing is necessary, the method further comprising:
sending a received transaction total to a payment gateway, via a network, for approvals;
receiving an issuer response including an approval or denial, a response cryptogram indicating that an issuing bank is legitimate, and issuer scripts; and
loading the issuer scripts on the integrated circuit.

15. The method of claim 1, further comprising: in response to determining that the second message is the reject message,
selecting a second inference type from among the set of two or more inference types, the second inference type using a second criteria to infer a second probable card brand and a second probable card type of the payment card used for the transaction, and
determining a second inference comprising the second probable card type and the second probable card brand based on the second inference type;
identifying a second application, different from the first application, based on the second probable card type and the second probable card brand;

determining whether the integrated circuit accepts or rejects the second application; and in response to the integrated circuit accepting the second application, completing, by the PIN pad device, the transaction using the second application.

16. The method of claim 15, wherein when the integrated circuit rejects one or more inferred applications, the method further comprises:

falling back to a default application selection process that does not infer card brands or card types.

17. A device for performing a transaction with a payment card comprising an integrated circuit, the device comprising:

storage; and a processor configured to:

supply power to an integrated circuit of the payment card;

read the integrated circuit of the payment card with a reader of the device;

infer a card brand and a card type of the payment card comprising the processor further configured to:

select a first inference type from among a set of two or more inference types, each inference type using different criteria to infer a probable card brand and a probable card type of the payment card used for the transaction, and determining a first inference comprising a first probable card type and a first probable card brand based on the first inference type;

identify a first application based on a combination of the first probable card brand and the first probable card type, based, at least in part, on data stored in the storage;

send a first message containing an identifier of the first application to the integrated circuit without querying the integrated circuit of the payment card for application identifiers associated with card brands or card types;

receive a second message from the integrated circuit, the second message being a confirm message confirming the first application, or a reject message rejecting the first application; and in response to determination that the second message is the confirm message, complete the transaction using the first application.

18. The device of claim 17, wherein the selection from among the set of two or more inference types is based further on the data stored in the storage comprising data indicative of:

a first criteria for selection of the first inference type comprising a plurality of total market shares of respective combinations of card brand and card type in a region;

a second criteria for selection of the second inference type comprising a plurality of market shares of respective combinations of card brand and card type for a merchant receiving the payment card; and a third criteria for selection of a third inference type comprising a known relationship between the merchant and the card brand.

19. The device of claim 17, wherein the device for performing the transaction comprises a PIN pad device.

20. A computer software product comprising:

a non-transitory computer-readable medium comprising code that, when executed by a processor of a PIN pad device, causes the PIN pad device to perform operations, comprising:

supplying power to an integrated circuit of the payment card;

reading the integrated circuit of the payment card with a reader of the PIN pad device;

inferring a card brand and a card type of the payment card comprising:

selecting a first inference type from among a set of two or more inference types, each inference type using different criteria to infer a probable card brand and a probable card type of the payment card used for the transaction, and determining the a first inference comprising a first probable card type and a first probable card brand based on the first inference type;

identifying a first application based on a combination of the first probable card brand and the first probable card type;

sending a first message containing an identifier of the first application to the integrated circuit without querying the integrated circuit of the payment card for application identifiers associated with card brands or card types;

receiving a second message from the integrated circuit, the second message being a confirm message confirming the first application, or a reject message rejecting the first application; and in response to determining that the second message is the confirm message, completing, by the PIN pad device, the transaction using the first application.

* * * * *